US011513950B2

(12) United States Patent
Gunnam

(10) Patent No.: US 11,513,950 B2
(45) Date of Patent: Nov. 29, 2022

(54) WEAR LEVELING IN NON-VOLATILE MEMORY

(71) Applicant: Western Digital Technologies, Inc., San Jose, CA (US)

(72) Inventor: Kiran Kumar Gunnam, Santa Clara, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/213,005

(22) Filed: Mar. 25, 2021

(65) Prior Publication Data

US 2022/0075717 A1 Mar. 10, 2022

Related U.S. Application Data

(60) Provisional application No. 63/075,462, filed on Sep. 8, 2020.

(51) Int. Cl.
*G06F 12/02* (2006.01)
*G06F 12/0873* (2016.01)
*G06F 3/06* (2006.01)

(52) U.S. Cl.
CPC ........ *G06F 12/0246* (2013.01); *G06F 3/0619* (2013.01); *G06F 3/0635* (2013.01); *G06F 3/0679* (2013.01); *G06F 12/0873* (2013.01); *G06F 2212/7201* (2013.01); *G06F 2212/7211* (2013.01)

(58) Field of Classification Search
None
See application file for complete search history.

(56) References Cited

U.S. PATENT DOCUMENTS

| 9,858,083 | B2 | 1/2018 | Catherwood et al. |
| 2017/0293555 | A1 | 10/2017 | Gunnam |
| 2017/0293568 | A1 | 10/2017 | Gunnam |

OTHER PUBLICATIONS

International Search Report and the Written Opinion for International Application No. PCT/US2021/034075 dated Aug. 23, 2021, 12 pages.
Data structure—Wikipedia, Modified Jul. 4, 2020, [online] Available at: <<https://en.wikipedia.org/w/index.php?title=Data_structure&oldid=966019157>>, 5 pages.
Multistage interconnection networks—Wikipedia, Modified Dec. 1, 2019, [online] Available at: <https://en.wikipedia.org/w/index.php?title=Multistage_interconnection_networks&oldid=928794770>, 7 pages.

*Primary Examiner* — Kevin Verbrugge
(74) *Attorney, Agent, or Firm* — Patterson & Sheridan, LLP; Steven H. VerSteeg

(57) ABSTRACT

A method, circuit, and system for managing wear levelling in non-volatile memory. First, an original physical block address (PBA) for a logical block address (LBA) of a write operation may be received. The original PBA is one of a set of PBAs for data blocks of a non-volatile memory array. Each of these PBAs may be uniquely mapped to a particular LBA using a multistage interconnection network (MIN). A swap PBA may next be determined for the LBA. The swap PBA may be selected from the set of PBAs uniquely mapped using the MIN. Then, the MIN may be configured to map the LBA to the swap PBA. Finally, data of a first data block stored at the original PBA may be swapped with data of a second data block stored at the swap PBA.

21 Claims, 18 Drawing Sheets

DATA STRUCTURE 506

WEAR LEVELING IN NON-VOLATILE MEMORY

CROSS-REFERENCE TO RELATED APPLICATIONS

This application claims benefit of U.S. Provisional Patent Application Ser. No. 63/075,462, filed Sep. 8, 2020, which is herein incorporated by reference.

BACKGROUND

Some data stored in a non-volatile memory device may be accessed and overwritten frequently, while other data may be written once and left in that state for a relatively long period of time. Physical non-volatile memory structures that experience frequent access may be electrically and mechanically stressed to a greater extent than infrequently accessed areas, and thus may experience greater amounts of wear level during the life of the device if action is not taken to mitigate such imbalanced use.

"Wear level" refers to a measure of a condition of a set of memory cells to perform their designed function of storing, retaining, and providing data. In certain embodiments, wear level is a measure of the amount of deterioration a set of memory cell has experienced. Wear level may be expressed in the form of a certain number of Program and Erase (PE) cycles relative to total number of PE cycles the memory cells are expected to complete before becoming defective/inoperable.

For example, suppose a set of memory cells are designed and fabricated to suitably function for five thousand PE cycles. Once the example set of memory cells reaches two thousand PE cycles, the wear level may be expressed as a ratio of the number of PE cycles completed to the number of PE cycles the set is designed to complete. In this example, the wear level may be expressed as 2/5, 0.4, or 40% worn, or used. The wear level may also be expressed in terms of how many PE cycles are expected from the set. In this example, the remaining wear, or life, of the set of memory cells may be 3/5, 0.6, or 60%. Said another way, wear level may represent the amount of wear, or life, of a memory cell that has been used or wear level may represent the amount of wear, or life, of a memory cell that remains before the memory cell is defective, inoperable, or unusable.

One way to prevent an imbalance in wear leveling may be to reassign logical block addresses (LBAs) referencing frequently accessed data to a different set of physical block addresses (PBAs), so that heavy access rates may be spread across the physical device. "Logical block address" refers to a value used in a block storage device to associate each of n logical blocks available for user data storage across the storage media with a logical address. In certain block storage devices, the logical block addresses (LBAs) may range from 0 to n per volume or partition. In block storage devices, each LBA maps directly to a particular data block, and each data block maps to a particular set of physical sectors, or physical data block addresses (physical block address) on the physical storage media. "Physical block address" refers to address information that uniquely identifies a physical location of a data block relative to other data blocks of a non-volatile memory array. A common method of managing LBA to PBA assignments may involve rearranging the entries in an indirection table based on entries in a frequency of use table.

For page-based non-volatile memory, one can maintain a table for frequency of use and an indirection table for logical pages. The most frequently addressed logical addresses may be periodically mapped to physical word lines. For a drive with M pages/sectors, an indirection table may have M entries, and each entry may take up N bits, where N is log 2(M).

For a 2-terabyte drive with 512-byte data blocks, $$M=(2\times10^{12})/512=3.9\times10^9, \text{ and}$$

$$N=32$$

The storage area needed to store an indirection table for such a drive would thus be, $$M\times\log_2(M)=125 \text{ Gb}(\sim15 \text{ GB})$$

The frequency of use table may consume a similar amount of storage area to that of the indirection table, so the total storage area needed for this metadata may be around 30 gigabytes. In some implementations, the metadata may be replicated using 2+1 redundancy, increasing this value to as much as 90 gigabytes, or around 4.5% of the total disk space. Therefore, as page-based non-volatile memory products increase in size, a more practical solution, taking up less disk space is needed for assigning and reassigning LBAs to PBAs to spread wear level out across the device, thus extending the device's lifespan.

BRIEF SUMMARY

This disclosure relates to a method for managing wear levelling in non-volatile memory. First, an original physical block address (PBA) for a logical block address (LBA) of a write operation may be received. The original PBA may comprise one of a set of PBAs for data blocks of a non-volatile memory array. Each of these PBAs may be uniquely mapped to a particular LBA using a multistage interconnection network (MIN). A swap PBA may next be determined for the LBA. The swap PBA may be selected from the set of PBAs uniquely mapped using the MIN. Then the MIN may be configured to map the LBA to the swap PBA. Finally, data of a first data block stored at the original PBA may be swapped with data of a second data block stored at the swap PBA.

This disclosure further relates to a circuit for managing wear leveling in non-volatile memory. The circuit may comprise a write access monitor, a path tracing circuit configured to trace an LBA to a PBA through a multistage interconnection network (MIN), an address translation manager, a control state, a cumulative control state, a wear level manager, and a data mover. The write access monitor may count write accesses to a non-volatile memory array by a read/write circuit. The MIN may comprise a plurality of switching elements and may map each LBA for the non-volatile memory array to a unique PBA. The address translation manager may translate an LBA for each write access to a PBA using the path tracing circuit. The control state may account for a current change made to the MIN. The cumulative control state may account for changes to the MIN over time. The wear level manager may change a mapping of two LBAs and two corresponding PBAs of the MIN in response to a signal from the write access monitor. The data mover may automatically swap data stored in data blocks of the two swapped PBAs in response to a signal from the wear level manager.

Finally, this disclosure relates to a system for managing wear leveling in non-volatile memory. The system may comprise a non-volatile memory array and a non-volatile memory controller. The non-volatile memory array may store data in memory cells. The non-volatile memory controller may further comprise a processor, volatile memory, a host interface manager, an address translation manager, a wear level manager, and a memory interface manager. The host interface manager may communicate between a host and the non-volatile memory controller. The address translation manager may comprise a Benes network, a control state, and a cumulative control state. The Benes network may map each logical block address (LBA) for the non-volatile memory array to a unique physical block address (PBA). The Benes network may comprise a plurality of switching elements. The control state may account for a current change made to the Benes network. The cumulative control state may account for changes to the Benes network over time. The wear level manager may comprise a router, a selector, and a data mover. The router may determine a path through the Benes network from an original PBA for an LBA of a write operation. The Benes network may comprise a set of stages. The selector may reference the cumulative control state to identify switching elements in a stage closest to outputs of the Benes network that are unchanged switching elements. The selector may further select a switching element along the path in the stage closest to outputs of the Benes network such that the selected switching element is an unchanged switching element. The selector may then change the selected unchanged switching element to a changed switching element, such that the path through the selected switching element leads to a swap PBA. The data mover may atomically swap data of a first data block stored at the original PBA with data of a second data block stored at the swap PBA. Finally, the memory interface manager may couple to the non-volatile memory array for reading and writing data to the non-volatile memory array.

BRIEF DESCRIPTION OF THE SEVERAL VIEWS OF THE DRAWINGS

To easily identify the discussion of a particular element or act, the most significant digit or digits in a reference number refer to the figure number in which that element is first introduced.

DETAILED DESCRIPTION

Rather than using metadata in an address mapping table to direct data indicated for an LBA of a write operation to a specific physical PBA and to track LBA/PBA mappings, the present disclosure uses a multistage interconnection network (MIN) to correlate or map LBAs to PBAs. In one example, an LBA indicated at the MIN inputs maps to a PBA indicated at the MIN outputs. Three alternative embodiments are presented for changing a MIN in order to swap PBAs assigned to LBAs:

1. A PBA may be chosen at random for assignment to an LBA experiencing heavy traffic, and a non-blocking MIN may be adjusted accordingly to record this changed assignment.
2. A random switching element within the MIN that lies along a path through the MIN representing a mapping from a certain PBA to an LBA may be switched from a first state, such as a pass-through state, to a second state, such as a cross-over state, or vice versa.
3. A switching element along the path used to indicate correlation may be selected using an algorithm, and that switch may have its state changed.

These aspects of the disclosed solution are described in greater detail below.

Figure 1:
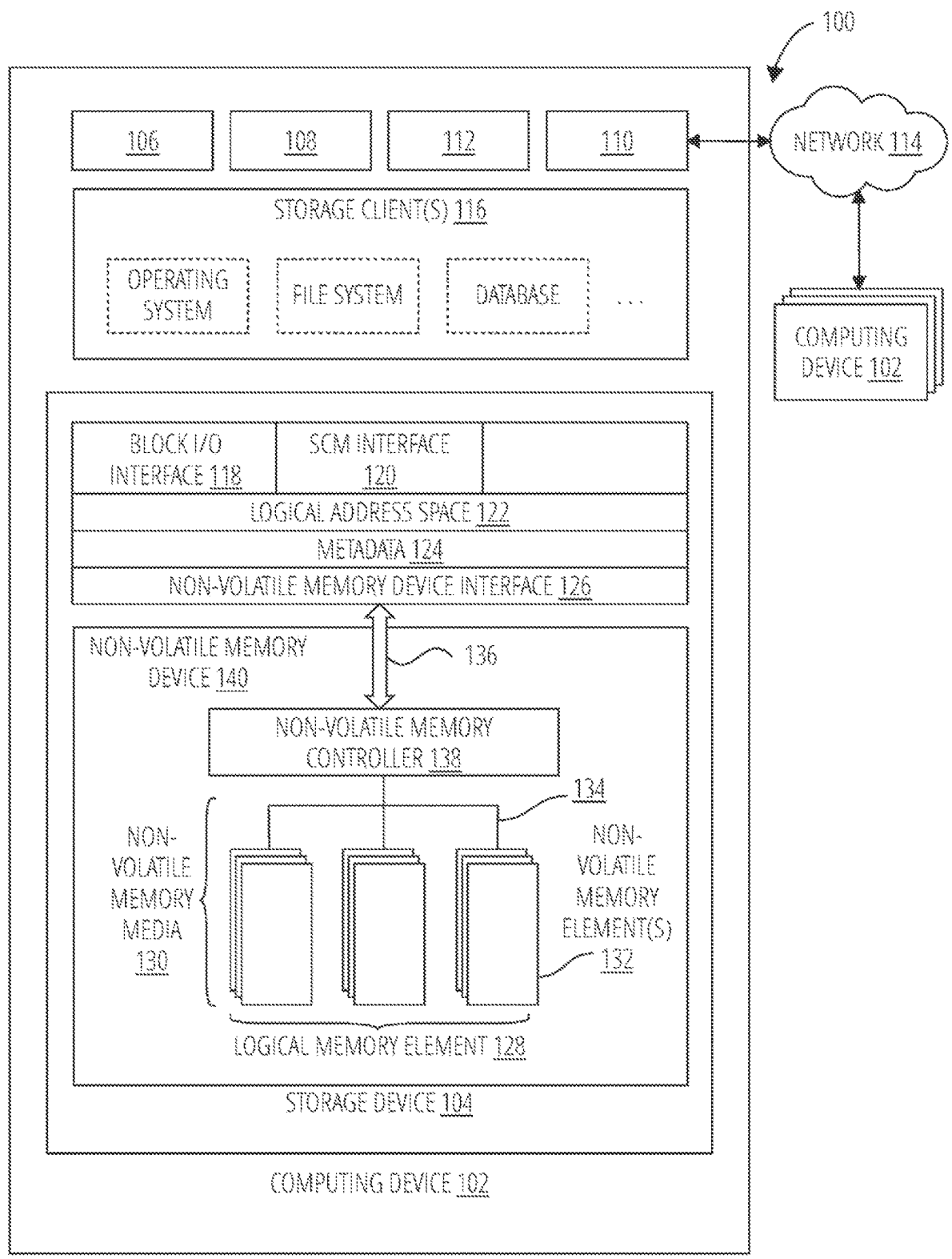
FIG. 1 is a schematic block diagram illustrating one embodiment of a system 100 in accordance with one embodiment.

FIG. 1 is a block diagram of one embodiment of a system 100 comprising non-volatile memory device 140 configured in accordance with an embodiment of the claimed solution. A storage device 104 of a computing device 102 may comprise a processor 106, volatile memory 108, and a communication interface 110. The processor 106 may comprise one or more central processing units, one or more general-purpose processors, one or more application-specific processors, one or more virtual processors (e.g., the computing device 102 may be a virtual machine operating within a host), one or more processor cores, or the like. The communication interface 110 may comprise one or more network interfaces configured to communicatively couple the computing device 102 and/or non-volatile memory controller 138 to a communication network 114, such as an Internet Protocol (IP) network, a Storage Area Network (SAN), wireless network, wired network, or the like.

The non-volatile memory device 140, in various embodiments, may be disposed in one or more different locations relative to the computing device 102. In one embodiment, the non-volatile memory device 140 comprises one or more non-volatile memory element(s) 132, such as semiconductor chips, memory die, or packages or other integrated circuit devices disposed on one or more printed circuit boards, storage housings, and/or other mechanical and/or electrical support structures. For example, the non-volatile memory device 140 may comprise one or more direct inline memory module (DIMM) cards, one or more expansion cards and/or daughter cards, a solid-state-drive (SSD) or other hard drive device, and/or may have another memory and/or storage form factor known to those of skill in the art. The non-volatile memory device 140 may be integrated with, and/or mounted on, a motherboard of the computing device 102, installed in a port and/or slot of the computing device 102, installed on a different computing device 102 and/or a dedicated storage appliance on the network 114, in communication with the computing device 102 over an external bus (e.g., an external hard drive), or the like.

The non-volatile memory device 140, in one embodiment, may be disposed on a memory bus of a processor 106 (e.g., on the same memory bus as the volatile memory 108, on a different memory bus from the volatile memory 108, in place of the volatile memory 108, or the like). In a further embodiment, the non-volatile memory device 140 may be disposed on a peripheral bus of the computing device 102, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCie Advanced Switching (PCie-AS) bus, or the Ike. In another embodiment, the non-volatile memory device 140 may be disposed on a data network 114, such as an Ethernet network, an Infiniband network, SCSI RDMA over a network 114, a storage area network (SAN), a local area network (LAN), a wide area network (WAN) such as the Internet, another wired and/or wireless network 114, or the like.

The computing device 102 may further comprise a non-transitory, computer readable storage medium 112. The computer readable storage medium 112 may comprise executable instructions configured to cause the computing device 102 (e.g., processor 111) to perform steps of one or more of the methods disclosed herein.

According to various embodiments, a non-volatile memory controller 138 may manage one or more non-volatile memory device 140 and/or non-volatile memory element(s) 132. The non-volatile memory device 140 may comprise recording, memory, and/or storage devices, such as solid-state storage device(s) and/or semiconductor storage device(s) that are arranged and/or partitioned into a plurality of addressable storage locations. As used herein, a storage location refers to any physical unit of memory (e.g., any quantity of physical storage media on a non-volatile memory device 140). Memory units may include, but are not limited to pages, physical pages memory divisions, blocks, data blocks, erase blocks, sectors, collections or sets of physical storage locations (e.g., logical pages, logical blocks, logical erase blocks), or the like.

"Physical page" refers to the smallest physical unit, or storage block, within a given memory die and/or plane, such as a memory die, that can be written to in a single operation. In certain embodiments, a physical page comprises a word line that is a row in a memory array of storage cells.

"Data block" refers to a smallest physical amount of storage space on physical storage media that is accessible, and/or addressable, using a storage command. The physical storage media may be volatile memory media, non-volatile memory media, persistent storage, non-volatile storage, flash storage media, hard disk drive, or the like. Certain conventional storage devices divide the physical storage media into volumes or logical partitions (also referred to as partitions). Each volume or logical partition may include a plurality of sectors. One or more sectors are organized into a block (also referred to as a data block).

In certain storage systems, such as those interfacing with the Windows® operating systems, the data blocks are referred to as clusters. In other storage systems, such as those interfacing with UNIX, Linux, or similar operating systems, the data blocks are referred to simply as blocks. A data block or cluster represents a smallest physical amount of storage space on the storage media that is managed by a storage controller. A block storage device may associate n data blocks available for user data storage across the physical storage media with a logical block address (LBA), numbered from 0 to n. In certain block storage devices, the logical block addresses may range from 0 to n per volume or logical partition. In conventional block storage devices, a logical block address maps directly to one data block.

"Erase block" refers to a logical erase block or a physical erase block. In one embodiment, a physical erase block represents the smallest storage unit within a given die that can be erased at a given time (e.g., due to the wiring of storage cells on the die). In one embodiment, logical erase blocks represent the smallest block erasable by a non-volatile memory controller in response to receiving an erase command. In such an embodiment, when the non-volatile memory controller receives an erase command specifying a particular logical erase block, the non-volatile memory controller may erase each physical erase block within the block simultaneously. It is noted that physical erase blocks within a given logical erase block may be considered as contiguous within a physical address space even though they reside in separate dies. Thus, the term "contiguous" may be applicable not only to data stored within the same physical medium, but also to data stored within separate media.

A device driver and/or the non-volatile memory controller 138, in certain embodiments, may present a logical address space 122 to the storage client(s) 116. As used herein, a logical address space 122 refers to a logical representation of memory resources. The logical address space 122 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 140 may maintain metadata 124, such as a logical to physical address mapping structure, to map logical addresses of the logical address space 122 to storage location on the non-volatile memory device 140. A device driver may be configured to provide storage services to one or more storage client(s) 116. The storage client(s) 116 may include local storage client(s) 116 operating on the computing device 102 and/or remote, storage client(s) 116 accessible via the network 114 and/or communication interface 110. The storage client(s) 116 may include, but are not limited to: operating systems, file systems, database applications, server applications, kernel-level processes, user-level processes, applications, and the like.

A device driver may be communicatively coupled to one or more non-volatile memory device 140. The one or more non-volatile memory device 140 may include different types of non-volatile memory devices including, but not limited to: solid-state storage devices, semiconductor storage devices, SAN storage resources, or the like. The one or more non-volatile memory device 140 may comprise one or more of a respective non-volatile memory controller 138 and/or non-volatile memory media 130. A device driver may provide write access to the one or more non-volatile memory device 140 via a traditional block I/O interface 118. Additionally, a device driver may provide write access to other functionality through the storage class memory interface (SCM interface 120). The metadata 124 may be used to manage and/or track data operations performed through any of the block I/O interface 118, SCM interface 120, or other, related interfaces.

In one embodiment, a user application such as software application operating on or in conjunction with the storage client(s) 116 uses the storage device 104. The storage client(s) 116 manage files and data and utilizes the functions and features of the non-volatile memory controller 138 and associated non-volatile memory media 130. Representative examples of storage clients include, but are not limited to, a server, a file system, an operating system, a database management system ("DBMS"), a volume manager, and the like. In one embodiment, the storage client(s) 116 write access to the one or more non-volatile memory device 140 via a traditional block I/O interface 118.

Certain conventional block storage devices divide the storage media into volumes or partitions. Each volume or partition may include a plurality of sectors. One or more sectors are organized into a block (also referred to as a data block). In certain storage systems, such as those interfacing with the Windows® operating systems, the data blocks are referred to as clusters. In other storage systems, such as those interfacing with UNIX, Linux, or similar operating systems, the data blocks are referred to simply as blocks. A block or duster represents a smallest physical amount of storage space on the storage media that is managed by the non-volatile memory controller 138. A block storage device may associate n blocks available for user data storage across the non-volatile memory media 130 with a logical block address, numbered from 0 to n. In certain block storage devices, the logical block addresses may range from 0 to n per volume or partition. In conventional block storage devices, a logical block address maps directly to a particular logical block.

A device driver may present a logical address space 122 to the storage client(s) 116 through one or more interfaces. As discussed above, the logical address space 122 may comprise a plurality of logical addresses, each corresponding to respective storage locations within the one or more non-volatile memory device 140. A device driver may maintain metadata 124 comprising any-to-any mappings between logical addresses and storage locations, or the like.

A device driver may further comprise and/or be in communication with a non-volatile memory device interface 126 configured to transfer data, commands, and/or queries to the one or more non-volatile memory device 140 over a bus 136, which may include, but is not limited to: a memory bus of a processor 106, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCie Advanced Switching (PCie-AS) bus, a network 114, Infiniband, SCSI RDMA, non-volatile memory express (NVMe), or the like. The non-volatile memory device interface 126 may communicate with the one or more non-volatile memory device 140 using input-output control (IO-CTL) command(s), IO-CTL command extension(s), remote direct memory write access, or the like.

The communication interface 110 may comprise one or more network interfaces configured to communicatively couple the computing device 102 and/or the non-volatile memory controller 138 to a network 114 and/or to one or more remote, network-accessible storage client(s) 116. The storage client(s) 116 may include local storage client(s) 116 operating on the computing device 102 and/or remote, storage client(s) 116 accessible via the network 114 and/or the communication interface 110. The non-volatile memory controller 138 is part of and/or in communication with one or more non-volatile memory device 140. Although FIG. 1 depicts a single non-volatile memory device 140, the disclosure is not limited in this regard and could be adapted to incorporate any number of non-volatile memory device 140.

The non-volatile memory device 140 may comprise one or more non-volatile memory element(s) 132 of non-volatile memory media 130, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random write access memory (nano RAM or NRAM), nanocrystal wire-based memory, silicon-oxide based sub-IO nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory element(s) 132 of non-volatile memory media 130, in certain embodiments, comprise storage class memory (SCM).

While legacy technologies such as NAND flash may be block and/or page addressable, storage class memory (SCM), in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory element(s) 132 of ReRAM, Memristor memory, programmable metallization cell memory, phase-change memory, nano RAM, nanocrystal wire-based memory, silicon-oxide based sub-IO nanometer process memory, graphene memory, SONOS memory, PMC memory, CBRAM, MRAM, and/or variations thereof.

While the non-volatile memory media 130 is referred to herein as "memory media," in various embodiments, the non-volatile memory media 130 may more generally comprise one or more non-volatile recording media capable of recording data, which may be referred to as a non-volatile memory medium, a non-volatile storage medium, or the like. Further, the non-volatile memory device 140, in various embodiments, may comprise a non-volatile recording device, a non-volatile memory device, a non-volatile storage device, or the like.

The non-volatile memory media 130 may comprise one or more non-volatile memory element(s) 132, which may include, but are not limited to: chips, packages, planes, die, or the like. A non-volatile memory controller 138 may be configured to manage data operations on the non-volatile memory media 130, and may comprise one or more processors, programmable processors (e.g., FPGAs), ASICs, micro-controllers, or the like. In some embodiments, the non-volatile memory controller 138 is configured to store data on and/or read data from the non-volatile memory media 130, to transfer data to/from the non-volatile memory device 140, and so on.

The non-volatile memory controller 138 may be communicatively coupled to the non-volatile memory media 130 by way of a bus 134. The bus 134 may comprise a bus for communicating data to/from the non-volatile memory element(s) 132. The bus 134, in one embodiment, may further comprise a control bus for communicating addressing and other command and control information to the non-volatile memory element(s) 132. In some embodiments, the bus 134 may communicatively couple the non-volatile memory element(s) 132 to the non-volatile memory controller 138 in parallel. This parallel write access may allow the non-volatile memory element(s) 132 to be managed as a group, forming a logical memory element 128. The logical memory element 128 may be partitioned into respective logical memory units (e.g., logical pages) and/or logical memory divisions (e.g., logical data blocks, logical blocks, logical erase blocks). The logical memory units may be formed by logically combining physical memory units of each of the non-volatile memory element(s) 132.

In some embodiments, the non-volatile memory controller 138 may be configured to store data on one or more asymmetric, write-once media, such as non-volatile memory media 130. As used herein, a "write once" storage medium refers to a storage medium that is reinitialized (e.g., erased) each time new data is written or programmed thereon. As used herein, an "asymmetric" storage medium refers to a storage medium having different latencies for different storage operations. Many types of non-volatile memory media 130 are asymmetric; for example, a read operation may be much faster than a write/program operation, and a write/program operation may be much faster than an erase operation (e.g., reading the media may be hundreds of times faster than erasing, and tens of times faster than programming the media).

In certain embodiments, the non-volatile memory media 130 may be partitioned into memory divisions that can be erased as a group (e.g., erase blocks) in order to, inter alia, account for the asymmetric properties of the media. As such, modifying a single data sector or data block in-place may involve erasing the entire erase block comprising the data, and rewriting the modified data to the erase block, along with the original, unchanged data. This may result in inefficient "write amplification," which may excessively wear the non-volatile memory media 130.

Therefore, in some embodiments, the non-volatile memory controller 138 may be configured to write data out-of-place. As used herein, writing data "out-of-place" refers to writing data to different physical storage location(s) rather than overwriting the data "in-place" (e.g., overwriting the data in the original physical location). Modifying data out-of-place may avoid write amplification, since existing, valid data on the erase block with the data to be modified need not be erased and rewritten. Moreover, writing data out-of-place may remove erasure from the latency impact of certain storage operations.

The non-volatile memory controller 138 may be organized into a plurality of erase blocks of word lines within a non-volatile memory element(s) 132, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of an erase block within a non-volatile memory element(s) 132 may be physically arranged in a monotonically increasing sequence of word line addresses, with consecutively addressed word lines also being physically adjacent (e.g., WL0, WL1, WL2, . . . WLN).

The non-volatile memory controller 138 may comprise and/or be in communication with a device driver executing on the computing device 102. A device driver may provide storage services to the storage client(s) 116 via one or more interfaces (block I/O interface 118, SCM interface 120, and/or others). In some embodiments, a device driver provides a computing device 102 block I/O interface 118 through which storage client(s) 116 perform block-level I/O operations. Alternatively, or in addition, a device driver may provide an SCM interface 120, which may provide other storage services to the storage client(s) 116. In some embodiments, the SCM interface 120 may comprise extensions to the block I/O interface 118 (e.g., storage client(s) 116 may write access the SCM interface 120 through extensions or additions to the block I/O interface 118). Alternatively, or in addition, the SCM interface 120 may be provided as a separate API, service, and/or library.

A device driver may further comprise a non-volatile memory device interface 126 that is configured to transfer data, commands, and/or queries to the non-volatile memory controller 138 over a bus 136, as described above.

Figure 2:
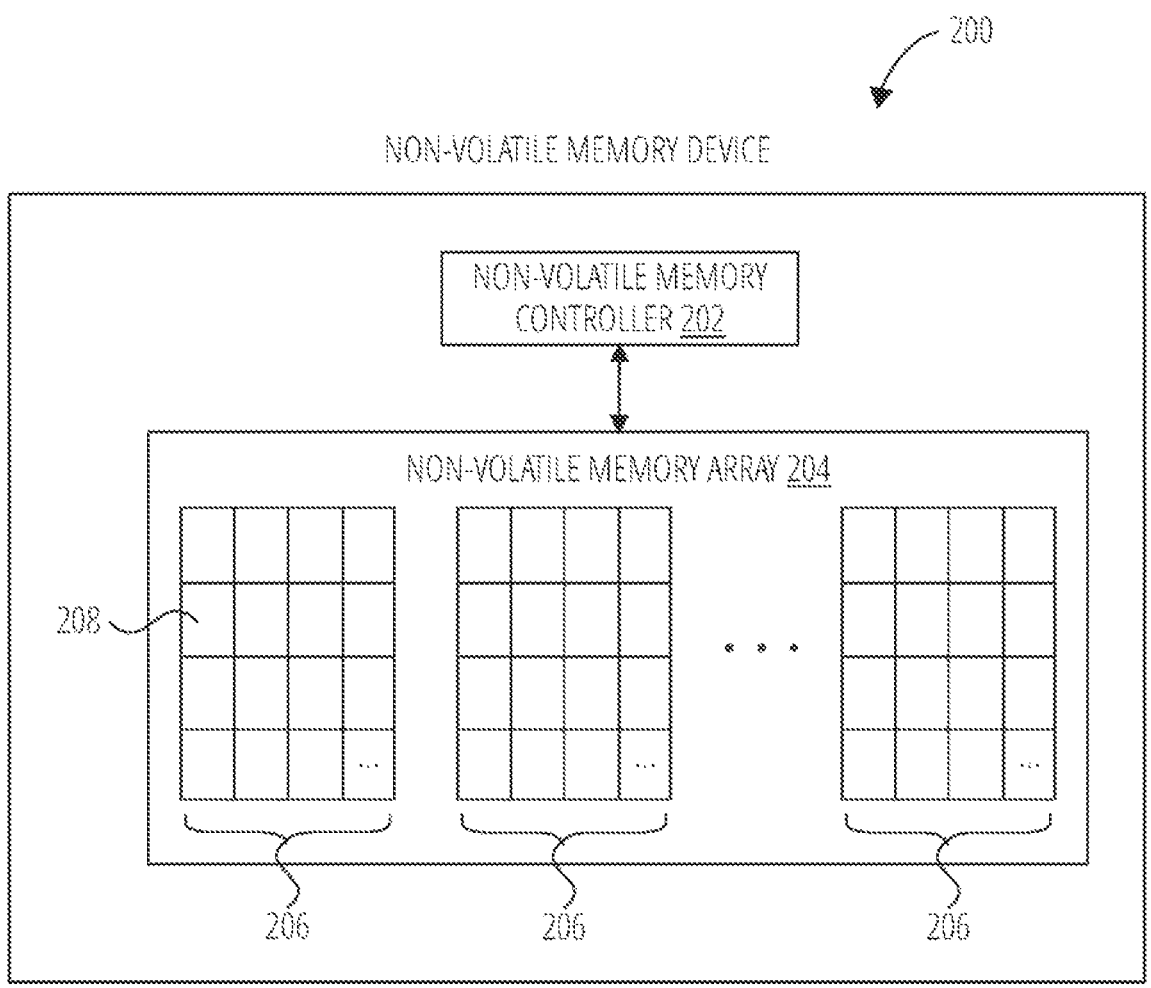
FIG. 2 is a block diagram illustrating one embodiment of a non-volatile memory device 200 in accordance with one embodiment.

FIG. 2 illustrates a non-volatile memory device 200 in accordance with one embodiment. The non-volatile memory device 200 comprises a non-volatile memory controller 202 and a non-volatile memory array 204. The non-volatile memory array 204 is an array of non-volatile memory. "Non-volatile memory" refers to shorthand name for non-volatile memory media. In certain embodiments, non-volatile memory media refers to the non-volatile memory media and the logic, controllers, processor(s), state machine(s), and/or other periphery circuits that manage the non-volatile memory media and provide write access to the non-volatile memory media.

"Non-volatile memory media" refers to any hardware, device, component, element, or circuit configured to maintain an alterable physical characteristic used to represent a binary value of zero or one after a primary power source is removed. Examples of the alterable physical characteristic include, but are not limited to, a threshold voltage for a transistor, an electrical resistance level of a memory cell, a current level through a memory cell, a magnetic pole orientation, a spin-transfer torque, and the like.

The alterable physical characteristic is such that, once set, the physical characteristic stays sufficiently fixed such that when a primary power source for the non-volatile memory media is unavailable the alterable physical characteristic can be measured, detected, or sensed, when the binary value is read, retrieved, or sensed. Said another way, non-volatile memory media is a storage media configured such that data stored on the non-volatile memory media is retrievable after a power source for the non-volatile memory media is removed and then restored.

Non-volatile memory media may comprise one or more non-volatile memory elements, which may include, but are not limited to: chips, packages, planes, memory die, and the like. Examples of non-volatile memory media include but are not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random write access memory (nano RAM or NRAM), nanocrystal wire-based memory, silicon-oxide based sub-I0 nanometer process memory, grapheme memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like.

While the non-volatile memory media is referred to herein as "memory media," in various embodiments, the non-volatile memory media may more generally be referred to as non-volatile memory. Because non-volatile memory media is capable of storing data when a power supply is removed, the non-volatile memory media may also be referred to as a recording media, non-volatile recording media, storage media, storage, non-volatile memory, volatile memory medium, non-volatile storage medium, non-volatile storage, or the like.

In certain embodiments, data stored in non-volatile memory media is addressable at a block level which means that the data in the non-volatile memory media is organized into data blocks that each have a unique logical address (e.g., LBA). In other embodiments, data stored in non-volatile memory media is addressable at a byte level which means that the data in the non-volatile memory media is organized into bytes (8 bits) of data that each have a unique address, such as a logical address. One example of byte addressable non-volatile memory media is storage class memory (SCM).

"Non-volatile memory controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the non-volatile memory controller is configured to store data on and/or read data from non-volatile memory media, to transfer data to/from the non-volatile memory device(s), and so on.

"Non-volatile memory array" refers to a set of non-volatile storage cells (also referred to as memory cells or non-volatile memory cells) organized into an array structure having rows and columns. A memory array is addressable using a row identifier and a column identifier.

Those of skill in the art recognize that a memory array may comprise the set of memory cells within a plane, the set of memory cells within a memory die, the set of memory cells within a set of planes, the set of memory cells within a sub-array, the set of memory cells within a set of memory die, the set of memory cells within a memory package, the set of memory cells within a set of memory packages, or with other known memory cell set architectures and configurations.

A non-volatile memory array may include a set of memory cells at a number of levels of organization within a storage or memory system. In one embodiment, memory cells within a plane may be organized into a memory array. In one embodiment, memory cells within a plurality of planes of a memory die may be organized into a memory array. In one embodiment, memory cells within a plurality of memory dies of a memory device may be organized into a memory array.

The non-volatile memory device 200 may belong to a family of memory referred to as storage class memory (SCM) or persistent memory. "Storage class memory" refers to a type of non-volatile memory configured for faster write access than NAND memory and configured to write access data organized into sectors. In one embodiment, a sector is 512 bytes. Examples of storage class memory may include ReRAM, Memristor memory, programmable metallization cell memory, phase-change memory (PCM, PCME, PRAM, PCRAM, ovonic unified memory, chalcogenide RAM, or C-RAM) and the like.

The non-volatile memory array 204 may be divided into a number of sub-arrays 206. Each sub-array 206 may be further divided into a number of partitions 208, as shown. The sub-arrays 206 and partitions 208 may be independently addressable, within the non-volatile memory array 204, and may comprise data blocks having physical block addresses. Alternatively, or in addition, the sub-arrays 206 and partitions 208 may be addressable in logical units or groups.

Figure 3:
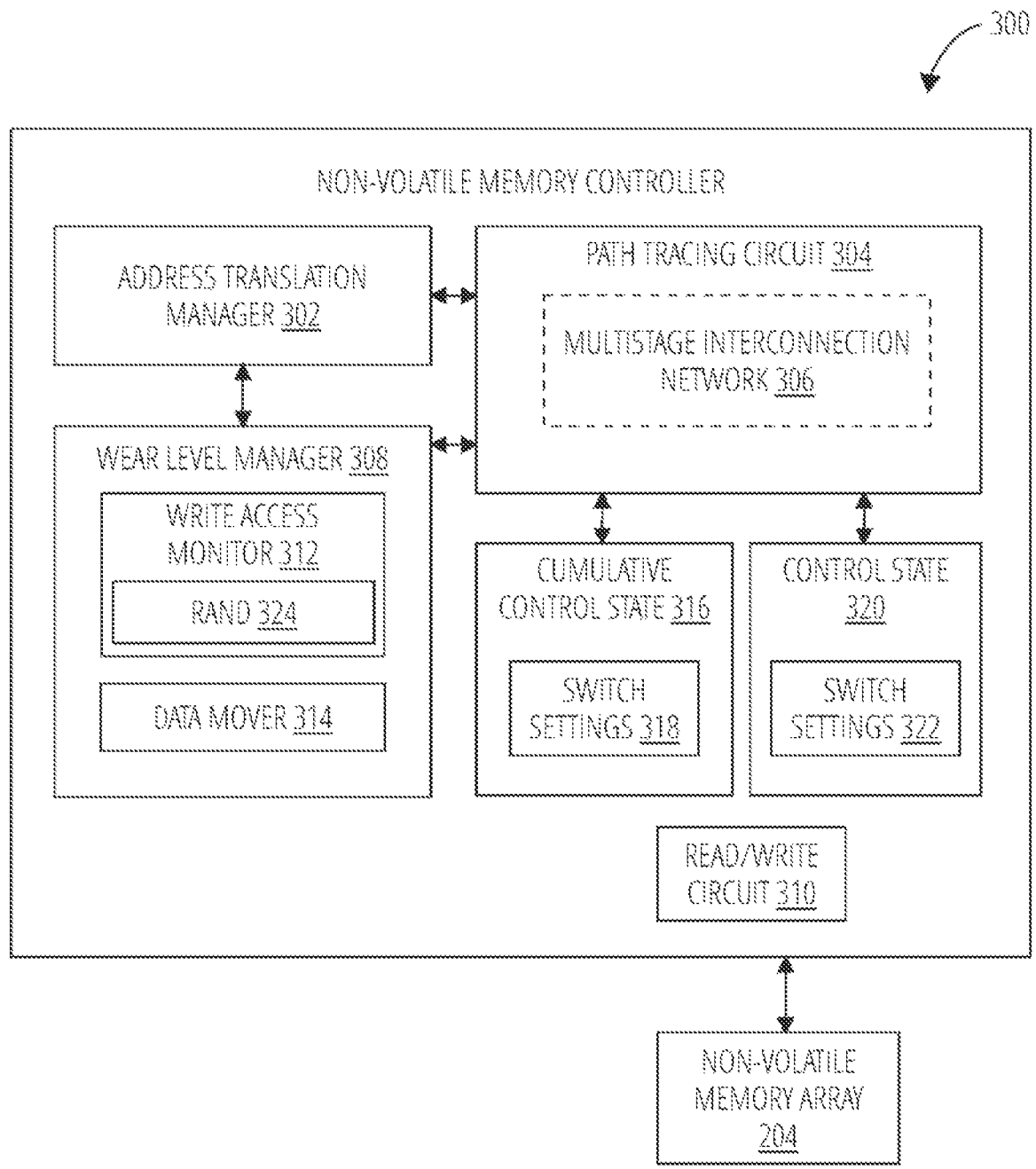
FIG. 3 is a block diagram illustrating one embodiment of a non-volatile memory controller 300 in accordance with one embodiment.

FIG. 3 illustrates a non-volatile memory controller 300 that may include one embodiment of a circuit for managing wear leveling in non-volatile memory. The non-volatile memory controller 300 may connect to a non-volatile memory array 204. The non-volatile memory controller 300 may comprise an address translation manager 302, a path tracing circuit 304 that navigates a multistage interconnection network 306, a wear level manager 308, read/write circuit 310, a write access monitor 312, a data mover 314, a cumulative control state 316, a switch settings 318, a control state 320, and a switch settings 322.

A read/write circuit 310 may direct a storage command to the non-volatile memory array 204. "Storage command" refers to any command relating to a storage operation. Examples of storage commands include, but are not limited to, read commands, write commands, maintenance commands, configuration command, administration command, diagnostic commands, test mode commands, countermeasure command, and any other command a storage controller may receive from a host or issue to another component, device, or system. In general, a storage command is a command issued to a storage or memory device from a host or another component or device. A storage command typically initiates one or more storage operations.

Storage operations such as read operations and write operations may include logical block addresses (LBAs) that identify a location for storing or accessing data by the read/write circuit 310. "Read operation" refers to an operation performed on a memory cell in order to obtain, sense, detect, or determine a value for data represented by a state characteristic of the memory cell. "Write operation" refers to a storage command or memory command configured to direct the recipient to write, or store, one or more data blocks on a persistent storage media, such as a hard disk drive, non-volatile memory media, or the like. A write command may include any storage command that may result in data being written to physical storage media of a storage device. The write operation may include enough data to fill one or more data blocks, or the write operation may include enough data to fill a portion of one or more data blocks. In one embodiment, a write operation includes a starting LBA and a count indicating the number of LBAs of data to write to on the storage media.

The address translation manager 302 may translate an LBA for each write access, contained within a storage command to a physical block address (PBA). "Address translation manager" refers to logic in a non-volatile storage device, chip, or component, such as a storage class memory device or FLASH memory device, that includes logical-to-physical address translation providing abstraction of the logical block addresses used by a storage client (e.g. a host) and the physical block addresses at which a storage controller stores data. The logical-to-physical translation layer maps logical block addresses (LBAs) to physical addresses of data stored on solid-state storage media. This mapping allows data to be referenced in a logical block address space using logical identifiers, such as a block address. A logical identifier does not indicate the physical location of data on the solid-state storage media but is an abstract reference to the data.

The address translation manager 302 may perform this translation using the path tracing circuit 304. The path tracing circuit 304 uses a multistage interconnection network 306 (MIN), also referred to as an access network to map an LBA to a PBA. The mapping operation of the path tracing circuit 304 may also be referred to as a look up operation.

"Multistage interconnection network" refers to any hardware, software, firmware, circuitry, component, module, logic, logic and data structure(s), device, or apparatus configured, programmed, designed, arranged, or engineered to implement a dynamic interconnection network that includes a set of interconnected nodes and each node is a switching element. Connections between nodes are edges. In such a dynamic interconnection network, interconnections between nodes may be changed by changing switching elements at the nodes such that a path from one node to other nodes in the interconnection network can be changed. (Search 'multistage interconnection networks' on Wikipedia.com, Dec. 1, 2019. Modified. Accessed Jul. 21, 2020.)

In one embodiment, a multistage interconnection network may comprise a logical construct or logical structure, implemented by a combination of firmware, software, logic, and/or data structures. A multistage interconnection network may comprise one of a variety of configurations. In certain multistage interconnection networks, the switching elements may be connected to each other in stages or layers. A multistage interconnection network may include a set of inputs and a set of outputs and each input to the multistage interconnection network may map to a single output of the multistage interconnection network. A traversal of the multistage interconnection network from a given input to a given output from node to node (e.g., switching element to switching element) is called a path and such traversal is called path tracing. The changing of one or more switching elements changes a path between the inputs and the outputs.

Examples of different multistage interconnection network configurations include a Benes network, an inverse Benes network, a Bitonic network, an inverse Bitonic network, an Omega network, an inverse Omega network, a Butterfly network, an inverse Butterfly network, and the like. In one embodiment, a multistage interconnection network may comprise a block cipher.

"Path tracing circuit" refers to a device, component, element, module, system, sub-system, circuitry, logic, hardware, sub-circuit, or circuit configured and/or operational to determine a path from an input value, port, or setting, of a multistage interconnection network (MIN) along each edge and through each node of the MIN to a corresponding output value, port, or setting.

In certain embodiments, each node of the MIN may comprise a switching element having two inputs and two outputs. The switching elements may comprise two distinct configuration modes: one causes the switching element to be a pass-through switching element and the other causes the switching element to be a cross-over switching element.

The path tracing circuit is configured to follow, traverse, or trace the path through the MIN by iteratively navigating from an input, a MIN input, to a first node in a first stage, determining a configuration, mode, or type for the node (e.g., pass-through switching element or cross-over switching element) and determining an output for the node that leads to a subsequent node in a subsequent stage, or a MIN output following a final stage. In certain embodiments, a path tracing circuit 304 may be implemented using software or firmware.

Advantageously, the path tracing circuit 304 is configured to map LBAs to PBAs or look up PBAs using LBAs using a multistage interconnection network 306 that is a logical construct (shown using the dashed lines) having a size that may be very large in comparison to other hardware or circuit implemented multistage interconnection networks 306.

For example, certain hardware implementations for a multistage interconnection network 306 may include 32 inputs and 32 outputs (e.g., $2^5 \times 2^5$). In contrast, the path tracing circuit 304 is configured to use a multistage interconnection network 306 having 4,294,96,296 inputs and 4,294,967,296 outputs (e.g., $2^{32} \times 2^{32}$).

While implementation of a multistage interconnection network 306 having $2^{32}$ inputs and $2^{23}$ outputs may be possible using hardware and/or circuits, a hardware implementation is generally not practical because of the complexity, amount of circuitry, memory, and processing power required. The path tracing circuit 304 overcomes these technical inefficiencies by leveraging the configuration of the multistage interconnection network 306, logic of the path tracing circuit 304 and an iterative set of steps for navigating the multistage interconnection network 306. In the illustrated embodiment, the multistage interconnection network 306 is a logical construct that the path tracing circuit 304 operates on in parts and/or portions in an iterative manner.

In one embodiment, the path tracing circuit 304 is configured to determine part of a full path through a multistage interconnection network 306 having N inputs and N outputs by iteratively processing sets of stages through the multistage interconnection network 306. In this manner a large multistage interconnection network 306, for example $2^2$ inputs by $2^{32}$ outputs can be processed using minimal hardware, minimal storage, minimal memory, and minimal processing.

In one embodiment, for each iteration the path tracing circuit 304 is configured to map a single input to one of $2^k$ outputs where k is a number of stages the path tracing circuit 304 is configured to implement in hardware. The number of stages implemented varies based on product and/or design specifications. If an embodiment of path tracing circuit 304 is configured to map for k=4 stages in each iteration, the path tracing circuit 304 can determine a mapping in the multistage interconnection network 306 through a sub-network of 15 nodes (1 for the starting node, 2 for the next stage, 4 for the next stage, and 8 for the fourth stage). In certain embodiments, the outputs from each stage in the sub-network may be pre-computed for a given input or input node. In this iterative manner, the multistage interconnection network 306 implements a small fraction of the whole multistage interconnection network 306.

Taking an example for explanation purposes, suppose the multistage interconnection network 306 is a Benes network (described in more detail hereafter) of size $2^N$ inputs by $2^N$ outputs, having $N*(N+1)/2$ stages with each node having $2^{(N-I)}$ nodes (e.g., switching elements). Further suppose N=32 and k=4 such that the multistage interconnection network 306 has 528 stages and each stage has 2,147,483,648 nodes. In such an example, the path tracing circuit 304 needs 132 iterations (#stages/k=528/4) to fully traverse the multistage interconnection network 306 and map one LBA to one PBA.

At the start of the 132 iterations, the path tracing circuit 304 is given the LBA as an input parameter. Using this input parameter, the output paths for each node in the k stages (e.g., four in this example) can be pre-computed and loaded by the path tracing circuit 304. The path through the k stages may be determined using a state machine or firmware configured according to a connectivity pattern for the multistage interconnection network 306.

Continuing the example with k=4, suppose the starting node is PI, Pout is a final stage in this set of stages and PI,0 represents a first node connected to P1 being a pass-through switching element and P1, I represents a second node connected to PI being a cross-over switching element. A path from PI to a Pout may be represented as follows: PI→(PI,0, PI,1)→(PI,0,0,PI,0,0,PI,1,0, PI,1,1)→(PI,0,0,0, PI,0,0,1,PI, 0,1,0, PI,0,1,1, PI,1,0,0, PI,1,0,1,PI,1,1,0, PI,1,1,1)→Pout for a single iteration. The Pout then becomes the starting node for a subsequent iteration and the path tracing circuit 304 repeats the path traversal for a subsequent set of k stages (4 stages here i.e. 5-8). After 132 iterations are completed the path tracing circuit 304 has determined the PBA that maps to the original LBA.

The wear level manager 308 may couple to the address translation manager 302 in order to implement the methods disclosed herein to prevent, or mitigate, excess wear in one portion or data block of the non-volatile memory array 204. "Wear level manager" refers to any hardware, software, firmware, circuitry, component, module, logic, device, or apparatus configured, programmed, designed, arranged, or engineered to manage a wear level for storage cells or memory cells. In certain embodiments, a wear level manager performs certain functions and/or operations on the storage cells to mitigate excessive wear or deterioration of the storage cells. In one embodiment, the wear level manager may perform operations to 'even out' or 'level' wearing of the storage cells across the storage cells of a non-volatile memory array.

The wear level manager 308 may include the write access monitor 312 and the data mover 314. "Write access monitor" refers to any hardware, software, firmware, circuitry, component, module, logic, device, or apparatus configured, programmed, designed, arranged, or engineered to track, monitor, or measure write accesses, access requests, storage commands, write operations, read operations, and the like between a host and a storage device.

"Write access" refers to a write operation having an associated LBA and data to be written to non-volatile memory media at a PBA uniquely mapped to the LBA or read operation having an associated LBA and data to be read from non-volatile memory media at a PBA uniquely mapped to the LBA.

The write access monitor 312 may count write accesses to the non-volatile memory array 204 by the read/write circuit 310. In one embodiment, the write access monitor 312 may signal the wear level manager 308 in response to a threshold number of write accesses by the read/write circuit 310. In another embodiment, the write access monitor 312 may signal the wear level manager 308 in response to a pseudo-random number of write accesses by the read/write circuit 310. In such an embodiment, the write access monitor 312 may include a random number generator 324.

The random number generator 324 may comprise a uniform random number generator (URNG) and a comparator. A seed for the URNG may come from a dock or a serial number for a product or the like. A probability factor, or rate for signaling for a swap operation may be set. In one example embodiment, the probability factor/rate is 0.01. This probability rate establishes a changing of LBA to PBA mapping on average once for every 100 write accesses. In one embodiment, the probability rate may serve as a security feature such that LBA to PBA assignments are changed at an unpredictable rate such that certain locations on the non-volatile memory media receive appropriate wear leveling.

In one example, the URNG may generate a 14-bit pseudo-random number between 0 and 16383 and the comparator may signal an LBA/PBA swap operation if a random number generated by the URNG is equal to or less than 164 (because 0.01 of 16384 is about 164). The random number generator 324 may generate a pseudo-random number for each write access. By applying the probability factor and using the comparator, the random number generator 324 determines a pseudo-random number of write accesses. In one embodiment, the pseudo-random number of write accesses may comprise a number of write accesses performed before the random number generator 324 together with the probability factor and comparator signals to trigger an LBA/PBA swap operation. In one embodiment, the pseudo-random number of write accesses comprises a number of write accesses N that occurs on average once for every D write accesses, where Q>10, performed before the random number generator 324 together with the probability factor and comparator signals to trigger an LBA/PBA swap operation.

In one embodiment, the pseudo-random number of write accesses may comprise a predefined pseudo-random number. The predefined pseudo-random number may be generated by a pseudo-random number generator. The write access monitor 312 may be configured to signal the wear level to change one or more LBA mappings when the pseudo-random number generator produces the predefined pseudo-random number. The write access monitor 312 may signal the pseudo-random number generator to generate a new pseudo-random number each time a write access occurs.

Advantageously, a non-volatile memory controller 300 with the wear level manager 308, write access monitor 312 and a random number generator 324 can determine when to perform an LBA/PBA swap operation without any input, communication, or interaction with a system level driver or application. The independent determination by the write access monitor 312 for when to perform the LBA/PBA swap operation provides an added level of security to ensure that non-volatile memory media is not compromised or worn out prematurely.

The wear level manager 308 may change a mapping of two or more LBAs and two or more corresponding PBAs of the multistage interconnection network 306 in response to a signal from the write access monitor 312. "Signal" refers to an electrical signal (wired or wireless), communication, or indication sent from one module, logic unit, component, circuit, driver, device, manager, or controller to another component, circuit, sub-circuit, driver, device, manager, or controller. In one embodiment, the signal comprises an analog signal. In another embodiment, the signal comprises a digital signal. In one embodiment, the signal comprises a message sent using software and/or firmware.

In response to the wear level manager 308 changing a mapping of two or more LBAs and two or more corresponding PBAs, the data mover 314 may atomically swap data stored in data blocks of the two or more swapped PBAs. In one embodiment, the data mover 314 may perform the swap in response to a signal from the wear level manager 308. "Data mover" refers to any hardware, software, firmware, circuit, component, module, logic, device, or apparatus configured, programmed, designed, or engineered to copy or move one or more data blocks from a source location to a destination location. In particular, a data mover is configured to handle low level operations to transfer a copy of one or more data blocks from a source PBA to a destination PBA.

In certain embodiments, a data mover deletes or erases the data block(s) once they are properly stored in the destination location. In other embodiments, the data mover uses a temporary storage space for data from data block(s) of the destination location and overwrites data in the destination location. If the data mover is swapping data between the destination location and the source location, the data mover may next store data in the temporary storage space in the source location.

The multistage interconnection network 306 may comprise a plurality of switching elements and may map each LBA for the non-volatile memory array 204 to a unique PBA as described below. The multistage interconnection network 306 may comprise an Omega network, a Benes network or a bitonic network. Embodiments of the multistage interconnection network 306 are described in greater detail with regard to FIG. 4 and FIG. 6.

The control state 320 may account for a current change made to the switch settings 322 for the multistage interconnection network 306. "Control state" refers to a state designed, engineered, configured, or arranged to represent a current status of switching elements within a multistage interconnection network (MIN) at a particular point in time.

Typically, a multistage interconnection network has an initial state that represents a status or configuration of each switching element when the multistage interconnection network is first created or instantiated. This initial state is a control state for the point in time time=0 when the MIN is first created. Over time, it may be desirable to change a state, configuration, or status of one or more switching elements within the MIN. Prior to the change, a control state represents the status of switching elements in the MIN. After the change, a new control state is created which represents a state of the MIN at a new point in time after the change.

A variety of changes may be represented by a control state. In one embodiment, a change is a change in a path through the MIN by changing the mapping of inputs to outputs for one or more switching elements.

A control state may be represented in a variety of ways including using algorithms and/or data structures. In one example embodiment, a control state is represented by a matrix or array data structure configured such that each entry in the matrix represents a node in an m×n network and a value for each entry may represent whether a path through a switching element at that node in the network has been changed/switched from an original state to a different state.

In an exemplary embodiment, the control state may represent a MIN of m×n switching elements in which each switching element is a switch having two inputs, each mapped to two outputs. In the exemplary embodiment, changes to a switching element may change the mapping outputs and inputs. In such an exemplary embodiment, each entry in the control state may be set to either a '0' or a '1' where '0' means the switching element has not been changed since its initial state and '1' means the switching element has been changed from its initial state.

"State" refers to a condition, attribute, mode, and/or characteristic, of an apparatus, device, component, system, sub-system, circuit, sub-circuit, machine, logic module, state machine, or the like. In certain embodiments, a state may include a model or representation of a logic module, a mapping, an association, a functional translation, a permutation, or the like. A state may be represented and/or defined by a single value, parameter, setting, attribute, or condition, or a plurality of values, parameters, settings, attributes, or conditions collectively or each individually.

"Current change" refers to a change that is presently being made, in the process of being made, or will be made in a short term future. The cumulative control state 316 may account for changes to the switch settings 318 of the multistage interconnection network 306 over time. "Switch setting" refers to setting, parameter, configuration, value, or the like that identifies, defines, or determines how a switch is configured to operate. As an example, a switch setting may identify whether a switch is open or closed. In another example, a switch setting may identify how one or more inputs route, map, or associate with one or more outputs.

For example, in one embodiment, a switch setting may identify whether a switching element is in a pass-through configuration, as in a pass-through switching element. Alternatively, or in addition, a switch setting may identify whether a switching element is in a cross-over configuration, as in a cross-over switching element.

In one embodiment, a switch setting may indicate whether a switching element has been changed from an initial or starting configuration or state. Switching elements may include one or more switch settings. Thus, switch settings 322 may represent a current state of switching elements and switch settings 318 may represent a state of switching elements over time, a historical state of switching elements.

The multistage interconnection network 306 may comprise logic configured to map the LBA to its original PBA based on the cumulative control state 316. "Cumulative control state" refers to a control state at a given point in time that includes an influence, or effect, of one or more control states applied iteratively over a number of iterations to an initial control state. A cumulative control state represents a summary of control states over the number of iterations to the present time.

Thus, a control state represents a state of a system, model, network, or device at a given point in time and a cumulative control state represents a state of the system, model, network, or device that includes any influence from the initial control state to the given point in time. Said another way, the cumulative control state tracks a history of control states for a system, model, device or network, such as a multistage interconnection network.

Figure 4:
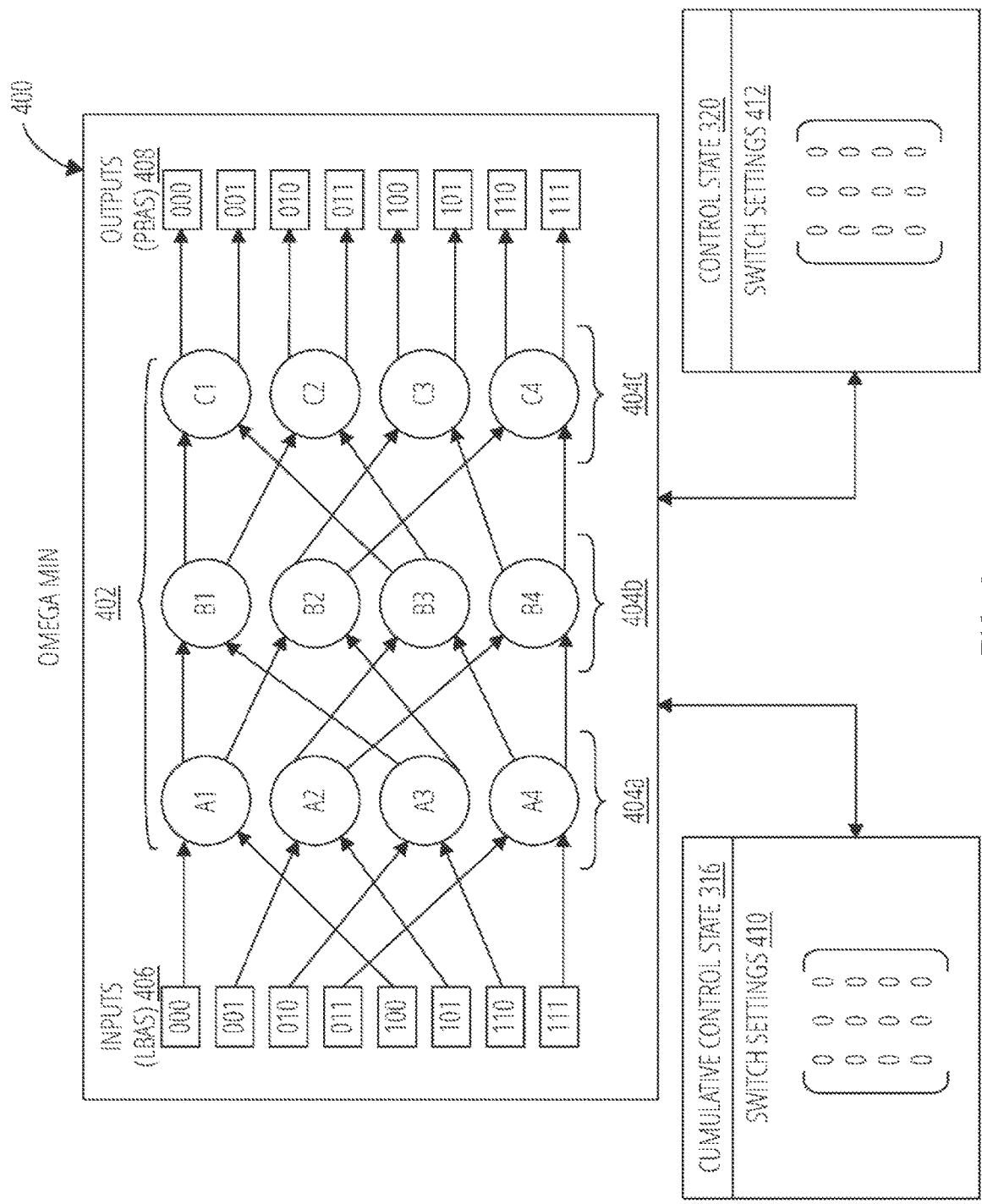
FIG. 4 illustrates an Omega multistage interconnection network 400 in accordance with one embodiment.

FIG. 4 illustrates an Omega multistage interconnection network 400 in accordance with one embodiment. "Omega network" or "Omega multistage interconnection network 400" refers to a type of multistage interconnection network having multiple stages of 2×2 switching elements. Each input has a dedicated connection to an output. An N*N Omega network has log(N) number of stages and N/2 number of switching elements in each stage for perfect shuffle between stages. Thus, the network has complexity of 0(N log(N)). Each switching element can employ its own switching algorithm. An Omega network is a blocking network. (Search 'multistage interconnection networks' on Wikipedia.com, Dec. 1, 2019. Modified. Accessed Jul. 8, 2020.)

The Omega multistage interconnection network 400 comprises switching elements 402 arranged in three stages: stage 404a, stage 404b, and stage 404c. The Omega multistage interconnection network 400 may be in communication with data structures configured to store a cumulative control state 316 comprising switch settings 410 and a control state 320 comprising switch settings 412.

Figure 5A:
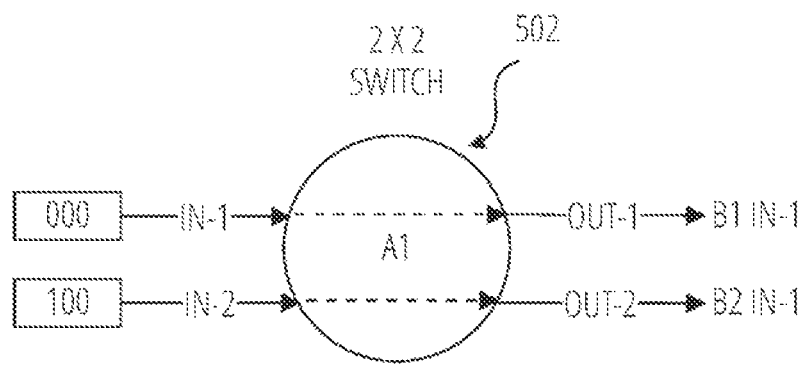
FIG. 5A illustrates an aspect of a switching element in accordance with one embodiment.
Figure 5B:
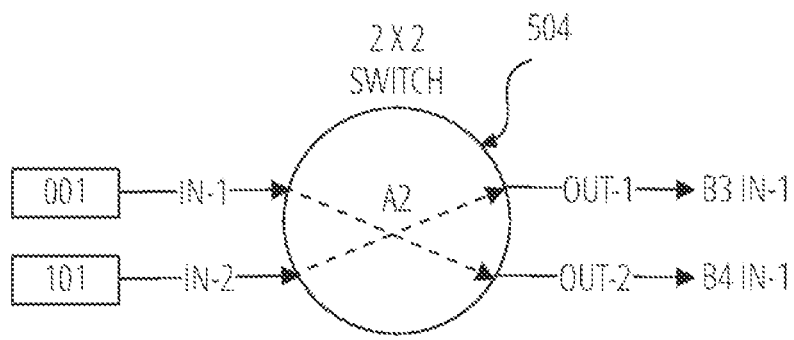
FIG. 5B illustrates an aspect of a switching element in accordance with one embodiment.

The switching elements 402 may comprise 2×2 (two by two) switches as described in greater detail with regard to FIG. 5A and FIG. 5B. "Switching element" refers to a node within a multistage interconnection network configured with 'm' input terminals or nodes and 'n' output terminals or nodes. A switching element routes a signal, path, track, course, route, line, or way, from an input terminal or node to one output terminal or node. In certain embodiments, 'm'='n' and 'm'=2. A switching element may be implemented in hardware, firmware, software, logic, a state machine, or the like.

The three stages of switching elements 402 may provide a configurable path, track, course, route, line, or way from inputs, such as LBAs 406 to outputs, such as PBAs 408 associated with the LBAs 406. "Stage" or "layer" refers to a set of switching elements within a multistage interconnection network. The number of stages within a multistage interconnection network and/or number of switching elements within each stage depends on the type of multistage interconnection network being used.

For example, an Omega network of N inputs and N outputs (N×N) has log 2(N) stages and each stage includes N/2 switching elements. In Benes network of N inputs and N outputs (N×N) has $(2*\log_2(N)-1)$ stages and each stage includes N/2 switching elements.

In certain embodiments, each switching element in a stage has the same number of inputs as outputs. In one embodiment, each switching element includes two inputs and two outputs.

"Path," "course," "track," "line," or "route" refers to a set of nodes within a multistage interconnection network traversed from an input of the multistage interconnection network to an output of the multistage interconnection network where each node within the multistage interconnection network directs to only one output node based on a given input to the node, where each node defines how inputs to the node map to outputs. A path may comprise a logical or physical path through the multistage interconnection network.

The control state 320 may comprise data structure such as a three by four matrix, as shown, configured to store an entry for each switching element that maps to a switching element currently being changed within the Omega multistage interconnection network 400. When an Omega multistage interconnection network 400 is first initialized both the control state 320 and cumulative control state 316 matrices may be initialized to an initial state, such as a random combination of zeros and ones, or all zeros. Each time a change is being made to the Omega multistage interconnection network 400, the control state 320 may start from an initialized state (such as all zeros) and the cumulative control state 316 may not be reinitialized and instead retain the state from prior changes made to the Omega multistage interconnection network 400.

The cumulative control state 316 may comprise a data structure such as a three by four matrix, as shown, configured to store an entry for each switching element (node of the network) that corresponds, or maps, to changed switching elements within the Omega multistage interconnection network 400.

The cumulative control state 316 may be configured to identify switching elements 402 not accounted for in the data structure as the unchanged switching elements. For example, in one embodiment, the cumulative control state 316 may be represented using a two-dimensional array in which empty or null entries in the array represent unchanged switching elements and entries having a value such as a '1' represent changed switching elements. Such a two-dimensional array as in this example may save storage space since a data value is not stored for entries representing unchanged switching elements and only a data value is used for entries representing changed switching elements.

"Changed switching element" refers to a switching element that has been changed at least once since an initial start-up, configuration, or instantiation of a multistage interconnection network. "Unchanged switching element" refers to a switching element that has not been changed at least once since an initial start-up or configuration or instantiation of a multistage interconnection network. A change to a switching element means that one or more inputs to the switching element change from routing to a first output to routing to a second output after the change.

In certain embodiments, the address translation manager 302 and wear level manager 308 use the path tracing circuit 304 and multistage interconnection network 306 to access, manage, reference, and/or convert or map LBAs to PBAs. Advantageously, the path tracing circuit 304 may navigate nodes and stages of the multistage interconnection network 306 using minimal logic or hardware and/or memory to increase performance. The address translation manager 302 and wear level manager 308 may coordinate with the path tracing circuit 304 to map an LBA to a PBA through a process referred to herein as "tracing," "path tracing," or "traversal."

Next, an example describes how the path tracing circuit 304 navigates the multistage interconnection network 306. In FIG. 4, suppose an LBA to be mapped is '100'. First, the path from input '100' along the edge between input '100' and node 'A1' in stage 404a is taken.

In certain embodiments, the path tracing circuit 304 may be implemented using a state machine, a small sequential circuit, or the like. The path tracing circuit 304 may have multiple input data values that together with the logic, enable the path tracing circuit 304 to model and traverse a multistage interconnection network having a large number of inputs and outputs (e.g., 32 or more). One of these inputs is the cumulative control state 316. The cumulative control state 316 identifies how each switching element within the multistage interconnection network is configured (e.g., pass-through indicated by a '0' or cross-over indicated by a '1').

The path tracing circuit 304 is configured to determine how the multistage interconnection network is organized and configured. For this first step, the path tracing circuit 304 is accessing a single switching element in a first stage 404a within the MIN. The path tracing circuit 304 recognizes that this node has just two outputs. The cumulative control state 316 identifies which input maps to which output (pass-through or cross-over). Because the path tracing circuit 304 is configured to understand how the MIN is organized, the path tracing circuit 304 can determine which two nodes in a second stage 404b may be visited after a given node in the first stage 404a. Similarly, the path tracing circuit 304 can determine which four nodes in a third stage 404c may be visited after nodes in the second stage 404b. Thus, the path tracing circuit 304 can iterate based on a current configuration of the MIN, the cumulative control state 316, and a given input value to traverse the MIN without loading data for all the nodes into memory at one time. Further, depending on the memory and/or processing resources available, the path tracing circuit 304 may map multiple paths through the MIN during a single iteration that is then refined as the nodes of each stage are reviewed. In one embodiment, in a single clock cycle, the path tracing circuit 304 may calculate up to five stages in advance. Such proactive calculations can be helpful in a Benes network of 2^32 inputs by 2^32 outputs because the Benes network may include 63 stages (N=2^32, #stages=2 log 2N−1).

Advantageously, the path tracing circuit 304 may save memory space by using a cumulative control state 316 that defaults to '0' for pass-through switching elements such that the path tracing circuit 304 only needs to load a '1' value for node connected to a node of a stage being examined. In this manner the path tracing circuit 304 may use a form of compression when using data of the cumulative control state 316 such that minimal memory space is used. In certain embodiments, a majority of the nodes of the MIN retain their original, initialized state of '0' for pass-through switching elements and the path tracing circuit 304 works with the cumulative control state 316 for cross-over switching elements using a minimal amount of memory space. For example, embodiments that implement the routine 1200 may change switching elements only in the last two or three stages (those closest to the outputs for the MIN) of the MIN, this results in a cumulative control state 316 that is zeros for all switching elements in the other stages and a minimal number of storage space requirements for the cumulative control state 316 (e.g., switching element configuration) for the switching elements in the last two or three stages.

Continuing the path tracing example, next, node 'A1' is reviewed to determine which output connects to the edge from input '100.' In this example, and at the current cumulative control state 316, node 'A1' is in a pass-through configuration such that input '100' connects to the output edge from 'A1' to 'B2.' So, the path is taken from 'A1' to 'B2.'

If node 'A1' was in a cross-over configuration the cumulative control state 316 may include a value that causes node 'A1' to be in a cross-over configuration which would connect input '100' to the output edge from 'A1' to 'B1.'

Next, node 'B2' is reviewed to determine which output connects to the edge from 'A1.' In this example and at the current cumulative control state 316, node 'B2' is in a pass-through configuration such that input edge from 'A1' connects to output edge from 'B2' to 'C3.' So, the edge is taken from 'B2' to 'C3.'

Next, node 'C3' is reviewed to determine which output connects to the edge from 'B2.' In this example and at the current cumulative control state 316, node 'C3' is in a pass-through configuration such that input edge from 'B2' connects to output edge from 'C3' to output '100', the PBA '100'. So, the edge is taken from 'C3' to output '100'. Having reached the output '100', the whole path has been traversed and the path tracing circuit 304 has successfully traced the path, the LBA '100' maps to PBA '100' in this example. The whole path comprises each edge traversed from the input LBA to the output PBA.

The path tracing circuit 304 may use path tracing for determining a PBA mapped to an LBA, such as in an LBA to PBA lookup, or in connection with the wear level manager 308 to determine how a MIN may be changed to implement a swap of PBAs between two LBAs.

FIG. 5A illustrates a switching element in a pass-through configuration or setting, also referred to as a pass-through switching element 502. The pass-through switching element 502 may be implemented as one of the switching elements 402 introduced in FIG. 4. In this example, the switching element 402 may be the switching element labeled 'A1' in that figure. "Pass-through switching element" refers to a switching element having a first input, a second input and a first output and a second output and the switching element configured such that a signal, path, track, course, route, traversal, line, or way, that enters on the first input passes straight through the switching element and exits on the first output and a signal, path, track, course, route, traversal, line, or way that enters on the second input passes straight through the switching element and exits on the second output.

The pass-through switching element 502 may be a two by two switch, meaning each of two inputs may be routed to each of two outputs, shown here as IN-1 and IN-2 and OUT-1 and OUT-2, respectively. In a pass-through configuration, as shown, IN-1 may connect to OUT-1 and IN-2 may connect to OUT-2. In this manner, the '000' input to IN-1 may be directed to OUT-1, which in the Omega multistage interconnection network 400 of FIG. 4 is in turn connected to the IN-1 input of switching element B1. The '100' input to IN-2 may be directed to OUT-2, which in turn may connect to the IN-1 input of switching element B2 as illustrated in FIG. 4.

FIG. 5B illustrates a switching element in a cross-over configuration or setting, also referred to as a cross-over switching element 504. The cross-over switching element 504 may be implemented as one of the switching elements 402 introduced in FIG. 4. In this example, switching element 402 may be the switching element labeled 'A2' in that figure. "Cross-over switching element" refers to a switching element having a first input, a second input and a first output and a second output and the switching element configured such a signal, path, track, course, route, line, or way, that enters on the first input exits on the second output and a signal, path, track, course, route, traversal, line, or way that enters on the second input exits on the first output.

The cross-over switching element 504 may be a two by two switch as shown in FIG. 5A. In the cross-over configuration shown, however, IN-1 may connect to OUT-2 and IN-2 may connect to OUT-1. In this manner, the '001' input to IN-1 may be directed to OUT-2, which in the Omega multistage interconnection network 400 of FIG. 4 is in turn connected to the IN-1 input of switching element B3. The '101' input to IN-3 may be directed to OUT-1, which in turn may connect to the IN-1 input of switching element B4, as illustrated in FIG. 4.

Figure 5C:
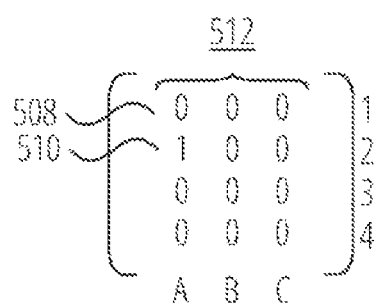
FIG. 5C illustrates an aspect of a switching element control state in accordance with one embodiment.

FIG. 5C illustrates an example data structure that may be used to track a control state and/or a cumulative control state in accordance with certain embodiments. "Data structure" refers to a data organization, management, and storage format that enables efficient write access and modification. More precisely, a data structure is a collection of data values, the relationships among them, and the functions or operations that can be applied to the data. (Search 'data structure' on Wikipedia.com, Jul. 4, 2020. Modified. Accessed Jul. 24, 2020.) Examples of a data structure includes but are not limited to a queue, a linked list, a list, an array, a matrix, a stack, and the like. "Entry" refers to a location within another thing such as a data structure. An entry is configured to hold, store, or retain a value, level, or setting.

The entries 512 of the data structure 506 may correspond to the switch settings 318 for the switching element 402 previously described. For example, switch setting for A1 508 may be found in the first entry 512 at the top of the left-most column of the matrix. This entry 512 may be a '0', corresponding to the state or condition of the A1 switching element not having been changed from its original pass-through switching element 502 configuration. The entry 512 for switch setting for A2 510 may be found in the next value, the next row, of the first column of the data structure 506. This entry 512 may be '1', corresponding to the state or condition of the A2 switching element having been changed to a cross-over switching element 504 configuration.

The Omega multistage interconnection network 400 illustrated is but a simple example for mapping a three bit LBA to a three bit PBA. When an Omega multistage interconnection network 400 is implemented in certain embodiments, an LBA may comprise 32 bits and the PBA may be 32 bits. An Omega multistage interconnection network 400 with 32 bits for each input would have 2^32 (or 4,294,967,296) inputs and 2^32 outputs, 32 stages each having 2^3 I (or 2,147,483,648) switching elements. In such an embodiment, the Omega multistage interconnection network 400 is very large with 32 stages each having 2^1 switching elements. Using a matrix to represent the cumulative control state 316 and/or the control state 320 uses less memory than storing LBA to PBA mappings in a lookup table.

In conventional modules, devices, systems, or controllers a multistage interconnection network may be used to represent nodes and paths in a processing or communication network. In such conventional system the size of the multistage interconnection network may be limited by the amount of volatile memory available to the conventional system because such systems may load data to represent an entire multistage interconnection network into volatile memory. Using a multistage interconnection network for mapping logical block addresses to physical block addresses as in the disclosed embodiments would be impractical because of the number of mappings being managed and the metadata required to manage such mappings.

Advantageously, the embodiments of the disclosure overcome this technical limitation by representing the multistage interconnection network as logic within a controller, firmware, circuit, and/or software and using data structure, such as a switch settings matrix for the cumulative control state and another switch settings matrix for the control state. By using this logic and these data structures, embodiments of the disclosed and claimed solution use a multistage interconnection network to map LBAs to PBAs while still using minimal volatile memory.

In certain embodiments, the data defining the structure, configuration, and state of a multistage interconnection network may be stored on non-volatile memory media. Due to the size of the multistage interconnection network, a non-volatile memory controller 300 may load portions of the data defining and representing the multistage interconnection network into volatile memory to provide PBA look up functionality and/or changing of LBA to PBA mappings as needed. The portions loaded may be significantly smaller than the data needed to represent the entire multistage interconnection network and its control state and its cumulative control state.

The portion(s) loaded may be relevant rows of a control state data structure or cumulative control state data structure, columns of a control state data structure or cumulative control state data structure, and/or paths through the multistage interconnection network. In this manner, the amount of volatile memory needed or used by the non-volatile memory controller 300 may be reduced to save costs and increase performance.

This is a simple example to illustrate technical efficiencies of using a matrix data structure to manage control state and/or cumulative control state for a MIN. With the switching elements 402 in a pass-through state in the illustrated example of FIG. 4, inputs may correspond with outputs as shown in the table below.

| Input | Output |
|---|---|
| 000 | 000 |
| 001 | 001 |
| 010 | 010 |
| 011 | 011 |
| 100 | 100 |
| 101 | 101 |
| 110 | 110 |
| 111 | 111 |

If, for example, the switching element 402 labeled "C1" is switched into a cross-over state, the inputs would be associated with outputs as shown in the following table.

| Input | Output |
|---|---|
| 000 | 001 |
| 001 | 000 |
| 010 | 010 |
| 011 | 011 |
| 100 | 100 |
| 101 | 101 |
| 110 | 110 |
| 111 | 111 |

Conventional methods of associating LBAs with PBAs may rely upon maintaining a lookup table such as the above, having sixteen entries of three bits each for a total of forty-eight bits, based on this simplified example. However, using the Omega multistage interconnection network 400, the settings for each switching element 402 may be represented as a '0' or '1', and maintained in a matrix having a single entry indicating in row 0, column 3 that the switching element is now a changed switching element. As described earlier a single entry in a matrix uses much less memory and/or storage than a sixteen entry look up table. A switch settings 410 table for a cumulative control state 316 may maintain settings for the switching elements 402 over time while a switch settings 412 in a control state 320 structure may maintain switch settings currently applied.

Figure 6:
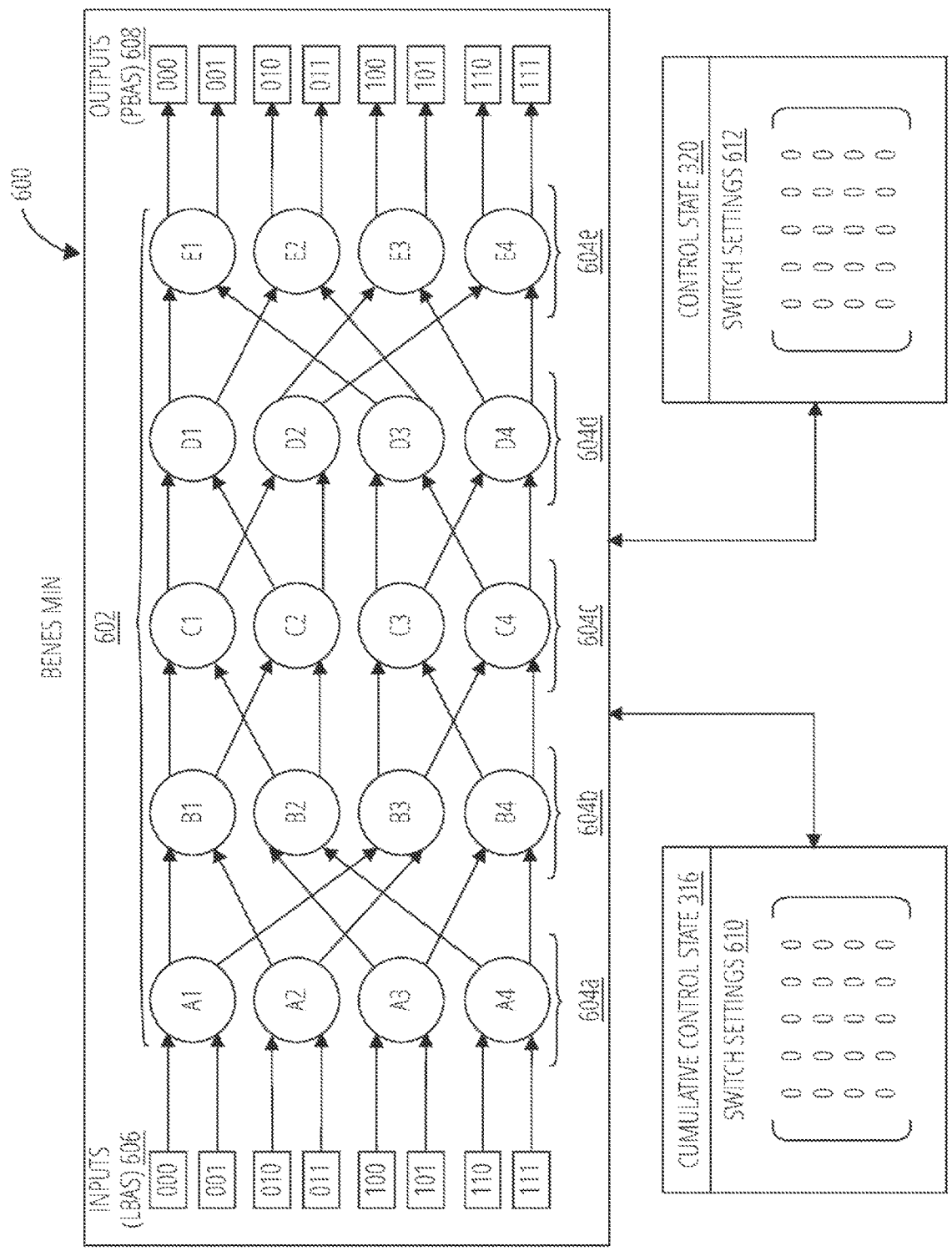
FIG. 6 illustrates a Benes multistage interconnection network 600 in accordance with one embodiment.

FIG. 6 illustrates a Benes multistage interconnection network 600 in accordance with one embodiment. The switching elements 602 are arranged in five stages, stage 604*a*, stage 604*b*, stage 604*c*, stage 604*d*, and stage 604*e*, with the inputs (LBAs 606) and outputs (PBAs 608) connected to form a Benes network configuration. "Benes network" or "Benes Omega multistage interconnection network 400" refers to a rearrangeable non-blocking network derived from the clos network by initializing n=m=2. There are (2 log(N)−1) stages, with each stage containing N/2 2*2 crossbar switches. An 8*8 Benes network has five stages of switching elements, and each stage has four switching elements. The center three stages have two 4*4 Benes network. The 4*4 Benes network can connect any input to any output recursively. (Search 'multistage interconnection networks' on Wikipedia.com, Dec. 1, 2019. Modified. Accessed Jul. 8, 2020.)

"Rearrangeable non-blocking multistage interconnection network" refers to a multistage interconnection network configured such that each input has a corresponding output and changing the configuration of any switching elements within the multistage interconnection network will still produce a path between each input and each output. A Benes network is an example of a rearrangeable non-blocking multistage interconnection network.

The switch settings 612 of the control state 320 may be modified to account for a selected switching element changing state. For example, a switching element changing from a pass-through state to a cross-over state (or vice versa) may be assigned a '1' in the control state switch settings 612, indicating the switching element is a changed switching element. A '0' in a matrix of switch settings 612 may indicate that no change to the state of the switching element has occurred and a '1' in a matrix of switch settings 612 may indicate that a change to the state of the switching element has occurred or is occurring. The switch settings 610 of the cumulative control state 316 may be updated, for example by a wear level manager 308 or another component of a non-volatile memory controller 300, to account for the modified control state switch settings.

Next, an example describes how one embodiment of a path tracing circuit 304 may navigate the multistage interconnection network 306. The path tracing circuit 304 may implement the steps outlined in the following example. In FIG. 6, suppose an LBA to be mapped is '010'. First, the path from input '010' along the edge between input '010' and node 'A2' in stage 604a is taken. Next, node 'A2' is reviewed to determine which output connects to the edge from input '010.' In this example and at the current cumulative control state 316, node 'A2' is in a pass-through configuration such that input '010' connects to the output edge from 'A2' to 'B1.' So, the path is taken from 'A2' to 'B1.'

Next, node 'B1' is reviewed to determine which output connects to the edge from 'A2.' In this example and at the current cumulative control state 316, node 'B1' is in a pass-through configuration such that input edge from 'A2' connects to output edge from 'B1' to 'C2.' So, the edge is taken from 'B1' to 'C2.'

Next, node 'C2' is reviewed to determine which output connects to the edge from 'B1.' In this example and at the current cumulative control state 316, node 'C2' is in a pass-through configuration such that the input edge from 'B1' connects to output edge from 'C2' to 'D1.' So, the edge is taken from 'C2' to 'D1.'

Next, node 'D1' is reviewed to determine which output connects to the edge from 'C2.' In this example and at the current cumulative control state 316, node 'D1' is in a pass-through configuration such that the input edge from 'C2' connects to output edge from 'D1' to 'E2.' So, the edge is taken/traversed from 'D1' to 'E2.'

Next, node 'E2' is reviewed to determine which output connects to the edge from 'D1.' In this example and at the current cumulative control state 316, node 'E2' is in a pass-through configuration such that input edge from 'D1' connects to output edge from 'E2' to output '010', the PBA '010.' So, the edge is taken from 'E2' to output '010.'

Having reached the output '010', the whole path has been traversed and the address translation manager 302 and/or wear level manager 308 have successfully traced the path, the LBA '010' maps to PBA '010' in this example. As can be seen from this example a change to a switching element along the path will alter the path and result in a new mapping from an original LBA to a different PBA.

Having reached the output '010', the whole path has been traversed and the path tracing circuit 304 has successfully traced the path, the LBA '010' maps to PBA '010' in this example. The whole path may comprise each edge traversed from the input LBA to the output PBA.

Figure 7:
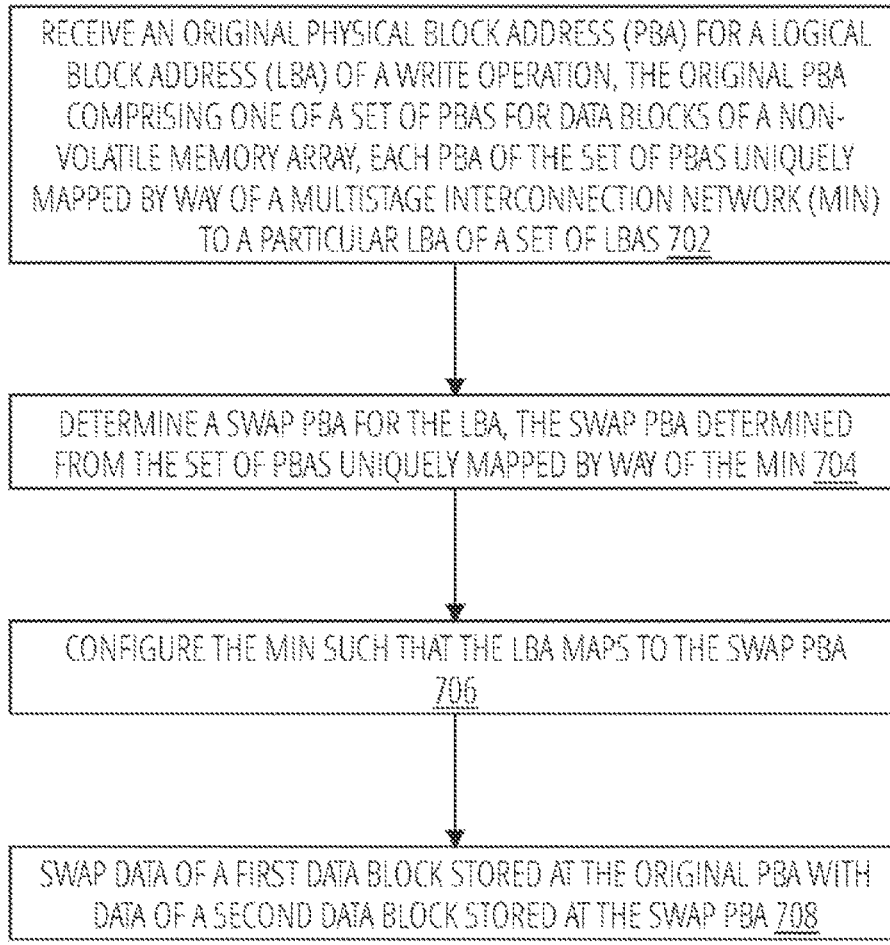
FIG. 7 illustrates a routine 700 in accordance with one embodiment.

FIG. 7 illustrates a routine 700 for implementing the disclosed solution, in accordance with one embodiment. In block 702, routine 700 receives an original physical block address (PBA) for a logical block address (LBA) of a write operation, the original PBA comprising one of a set of PBAs for data blocks of a non-volatile memory array, each PBA of the set of PBAs uniquely mapped by way of a multistage interconnection network (MIN) to a particular LBA of a set of LBAs.

In block 704, routine 700 determines a swap PBA for the LBA, the swap PBA determined from the set of PBAs uniquely mapped by way of the MIN. In block 706, routine 700 configures the MIN such that the LBA maps to the swap PBA.

In block 708, routine 700 swaps data of a first data block stored at the original PBA with data of a second data block stored at the swap PBA.

Figure 8:
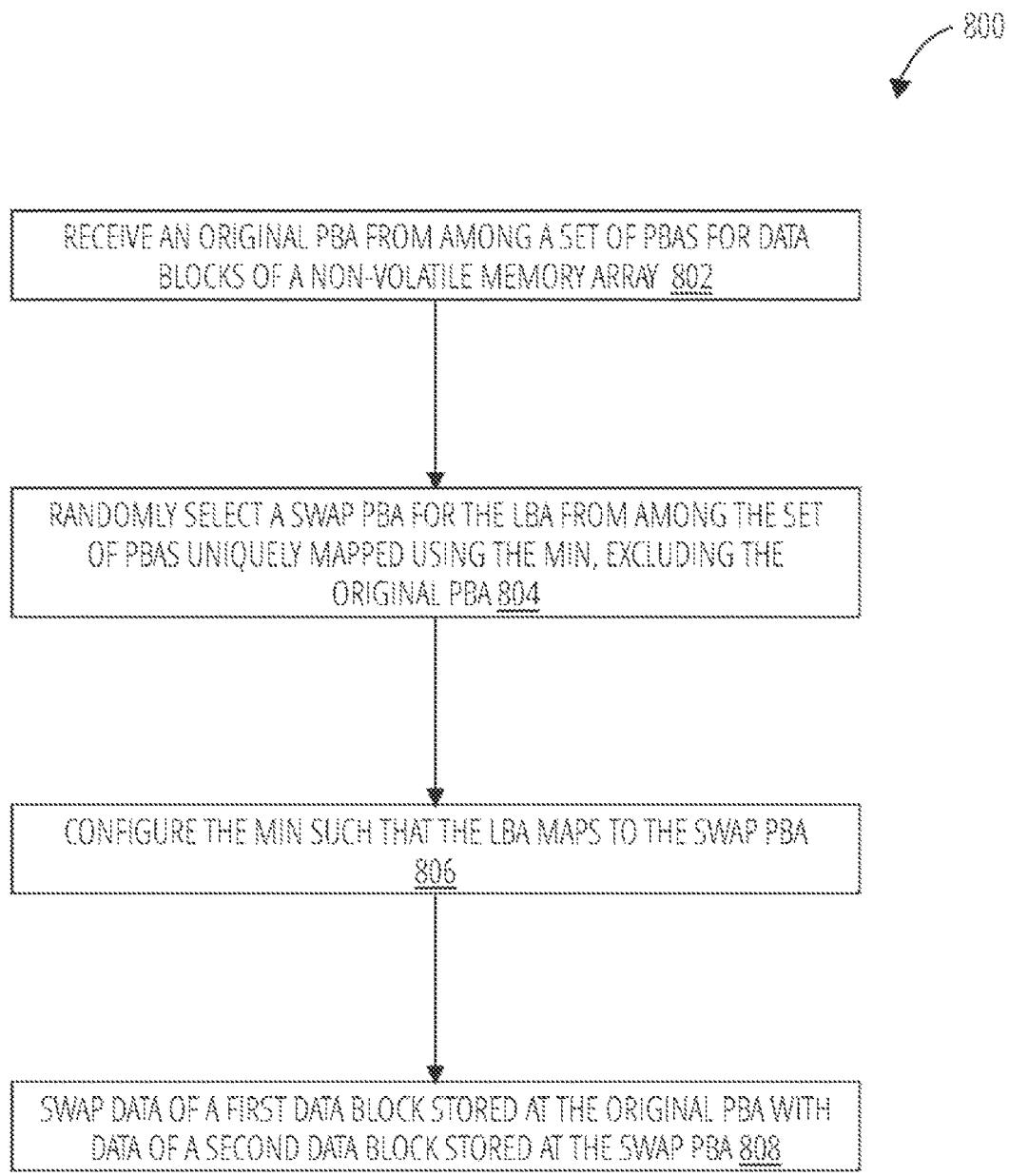
FIG. 8 illustrates a routine 800 in accordance with one embodiment.

FIG. 8 illustrates a routine 800 for implementing the disclosed solution, in accordance with one embodiment. The routine 800 begins at block 802 when an original physical block address (PBA) is received from among a set of PBAs. The original PBA comprises one of a set of PBAs for data blocks of a non-volatile memory array. "Original physical block address" refers to a physical block address that is associated, mapped, or related to a logical block address of a write access request such as a write operation and/or a read operation. The original PBA may be determined using a multistage interconnection network (MIN) that uniquely maps the original PBA to a particular LBA from a set of LBAs. The particular LBA may be identified in a storage command such as a write operation.

The MIN may comprise a rearrangeable non-blocking multistage interconnection network, such as a Benes network. In certain embodiments, a non-volatile memory controller 300 or wear level manager 308 may receive, block 802, the original PBA.

At block 804, a wear level manager 308, for example, may randomly select a swap PBA for the LBA. "Swap PBA" refers to a physical block address that is chosen, selected, or targeted to be swapped with an original PBA. The swap PBA may be selected from the set of PBAs mapped by way of the MIN, where the set of PBAs excludes the original PBA.

At block 806, the MIN may be configured such that the LBA of the storage command maps to the swap PBA. For example, the wear level manager 308 may determine a switching element common to the original PBA and the swap PBA and change the switching element such that the LBA of the storage command, such as a write operation or other write access, routes to the swap PBA rather than the original PBA.

At block 808, the data of a first data block stored at the original PBA may be swapped with data of a second data block stored at the swap PBA. In certain embodiments, the data may be swapped by a data mover 314 of a wear level manager 308.

Figure 9:
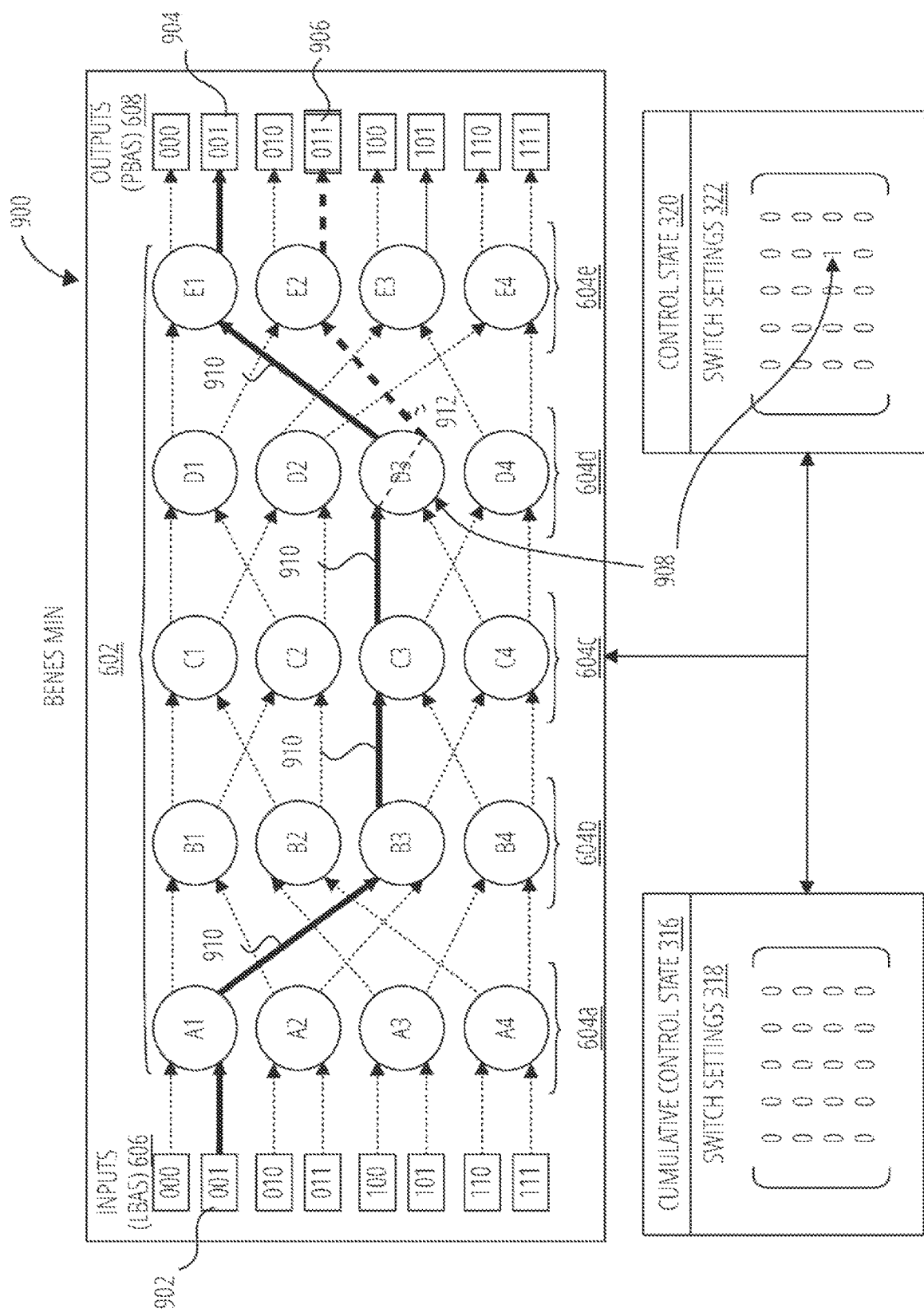
FIG. 9 illustrates a Benes multistage interconnection network 900 in accordance with one embodiment.

FIG. 9 illustrates a Benes multistage interconnection network 900 in accordance with one embodiment. In particular, FIG. 9 illustrates a Benes multistage interconnection network 900 compatible for use with the routine 800 described in relation to FIG. 8. The switching elements 602 of the Benes multistage interconnection network 900 are arranged in five stages: stage 604a, stage 604b, stage 604c, stage 604d, and stage 604e. The inputs (LBAs 606) connect through the switching element 602 to the outputs (PBAs 608) in a Benes network configuration as shown.

In one embodiment, the particular LBA 902 '001' may map through the switching elements 602 to the original PBA 904 '001' with the switching elements 602 in a pass-through configuration, as illustrated by FIG. 5A. The switch settings 318 indicated in the cumulative control state 316 may each be '0', indicating that the switching elements are unchanged switching elements.

A swap PBA 906 of '011' may be selected at random by the wear level manager 308 as described in the routine 800 of FIG. 8. Next, the wear level manager 308 may determine a switching element common to the original PBA 904 and the swap PBA 906 and change the switching element such that the LBA of the storage command routes to the swap PBA 906 rather than the original PBA 904. The wear level manager 308 may determine that the '001' input may be remapped to the swap PBA 906 output of '011' by reconfiguring switching element 'D3' (changed switching element 908) from a pass-through switching element to a cross-over switching element, see thick dashed path, thus providing a path 910 from the particular LBA 902 to the swap PBA 906 that changes at 'D3' to follow new path 912.

The wear level manager 308 may update the switch settings 322 and cumulative control state 316. The switch settings 322 of the control state 320 may be updated to include a '1' in the position associated with the 'D3' switching element 602, indicating that 'D3' is a changed switching element 908. In one embodiment, the cumulative control state 316 may be updated concurrently with the control state 320. In another embodiment, the switch settings 318 of the cumulative control state 316 may be updated with the current control state 320 just before the next update to the control state 320, and so may not immediately reflect the current switch settings 322, as is illustrated.

Figure 10:
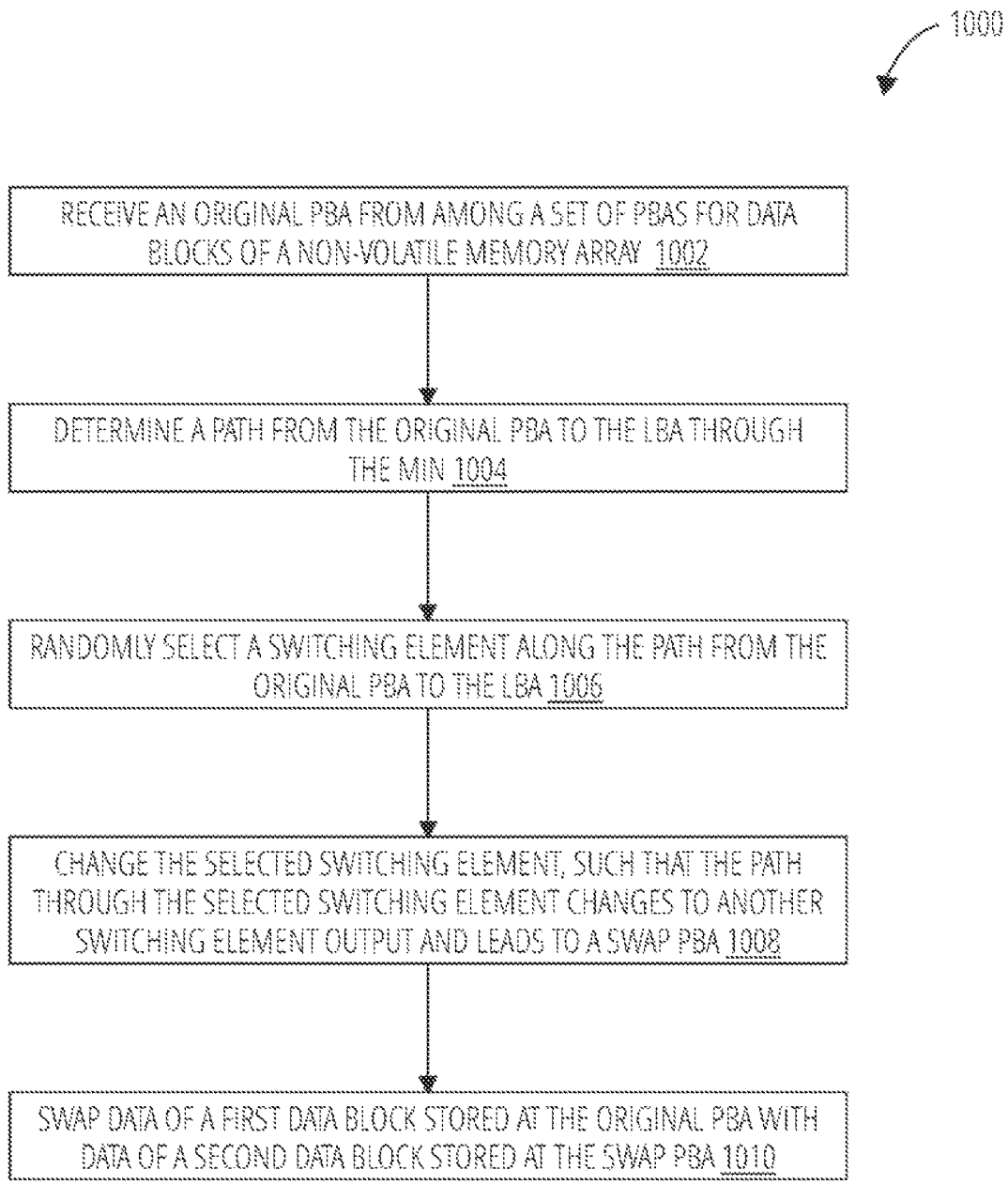
FIG. 10 illustrates a routine 1000 in accordance with one embodiment.

FIG. 10 illustrates a routine 1000 for implementing the disclosed solution, in accordance with one embodiment. The routine 1000 begins at block 1002 when an original physical block address (PBA) is received from among a set of PBAs. The original PBA comprises one of a set of PBAs for data blocks of a non-volatile memory array. A multistage interconnection network (MIN) is used to uniquely map the original PBA to a particular LBA for a write operation. The particular LBA may be one of a set of LBAs.

At block 1004, the wear level manager 308 may determine a path 1106 (See FIG. 11) from the particular LBA referenced in a storage command to the original PBA through the MIN. At block 1006, a switching element 602 along that path 1106 may be randomly selected.

At block 1008, the MIN may be configured such that the particular LBA maps to a swap PBA by changing the selected switching element's configuration such that the path through that switching element is changed to another output of that switching element, leading to the swap PBA. In certain embodiments, a wear level manager may be configured to trace the path 1106 from the selected switching element, such as the randomly selected switching element 1112 through the MIN to the swap PBA 1110.

Finally, at block 1010, the data of a first data block stored at the original PBA may be swapped with data of a second data block stored at the swap PBA.

Figure 11:
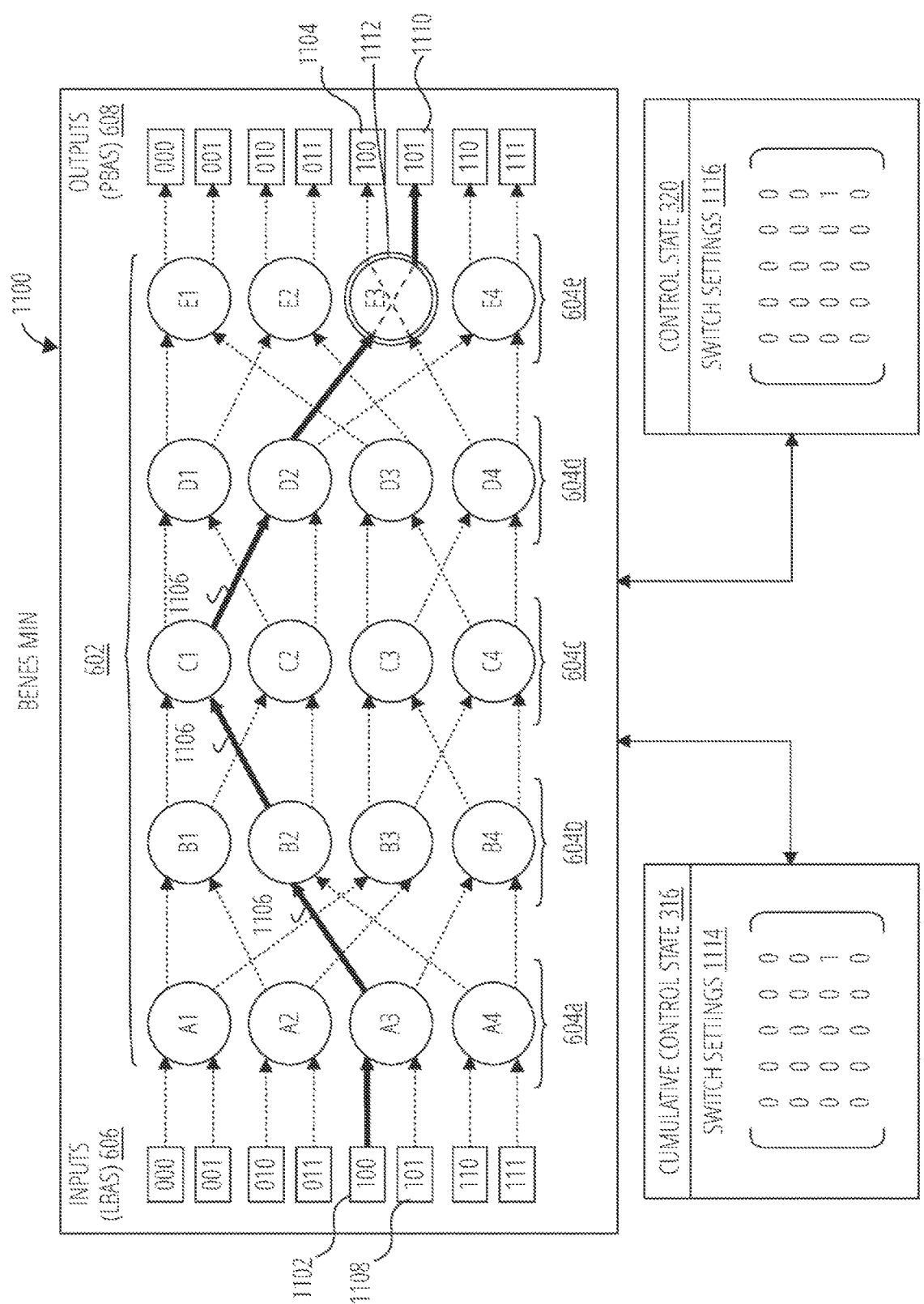
FIG. 11 illustrates a Benes multistage interconnection network 1100 in accordance with one embodiment.

FIG. 11 illustrates a Benes multistage interconnection network 1100 in accordance with one embodiment. In particular, FIG. 11 illustrates a Benes multistage interconnection network 1100 compatible for use with the routine 1000 described in relation to FIG. 10. The switching elements 602 of the Benes multistage interconnection network 1100 are arranged in five stages: stage 604a, stage 604b, stage 604c, stage 604d, and stage 604e. The inputs (LBAs 606) connect through the switching elements 602 to the outputs (PBAs 608) in a Benes network configuration as shown.

In one embodiment, a first LBA 1102 '100' may map through the switching elements 602 of the Benes multistage interconnection network 1100 to an original PBA 1104 '100.' The wear level manager 308 may determine that the original PBA 1104 may need to be swapped and may thus determine a path 1106 from the original PBA 1104 to the first LBA 1102 in accordance with the routine 1000 of FIG. 10. Such path tracing may be called reverse path tracing because the path is traced from the physical block address to a corresponding logical block address.

As illustrated, the path 1106 from first LBA 1102 to the original PBA 1104 may include switching elements 602 'A3', 'B2', 'C1', 'D2', and 'E3.' According to routine 1000, the wear level manager may randomly select one of these switching elements to be reconfigured, for example from a pass-through switching element to a cross-over switching element. In the illustrated example, the wear level manager 308 may randomly select switching element 602 'E3.' The switching element 602 'E3' becomes a selected switching element 1112. The wear level manager 308 may reconfigure, or switch, switching element 'E3.' In this manner first LBA 1102 now maps to swap PBA 1110 rather than original PBA 1104. In one embodiment, the wear level manager 308 may change the selected switching element 1112, such that the path 1106 through the selected switching element 1112 changes to another output of the selected switching element 1112 and leads to the swap PBA 1110. In certain embodiments, a wear level manager 308 may be configured to trace the path 1106 from the selected switching element 1112 through the MIN to the swap PBA 1110.

The switch settings 1116 of the control state 320 may be updated to include a '1' in the position associated with the 'E3' switching element. In one embodiment, the switch settings 1114 of the cumulative control state 316 may be updated concurrently with the control state 320, as shown.

A second LBA 1108 may be associated with data accessed at the swap PBA previous to this change by the wear level manager. The data at the swap PBA 1110 may be swapped with the data at the original PBA 1104 as part of routine 1000.

Figure 12:
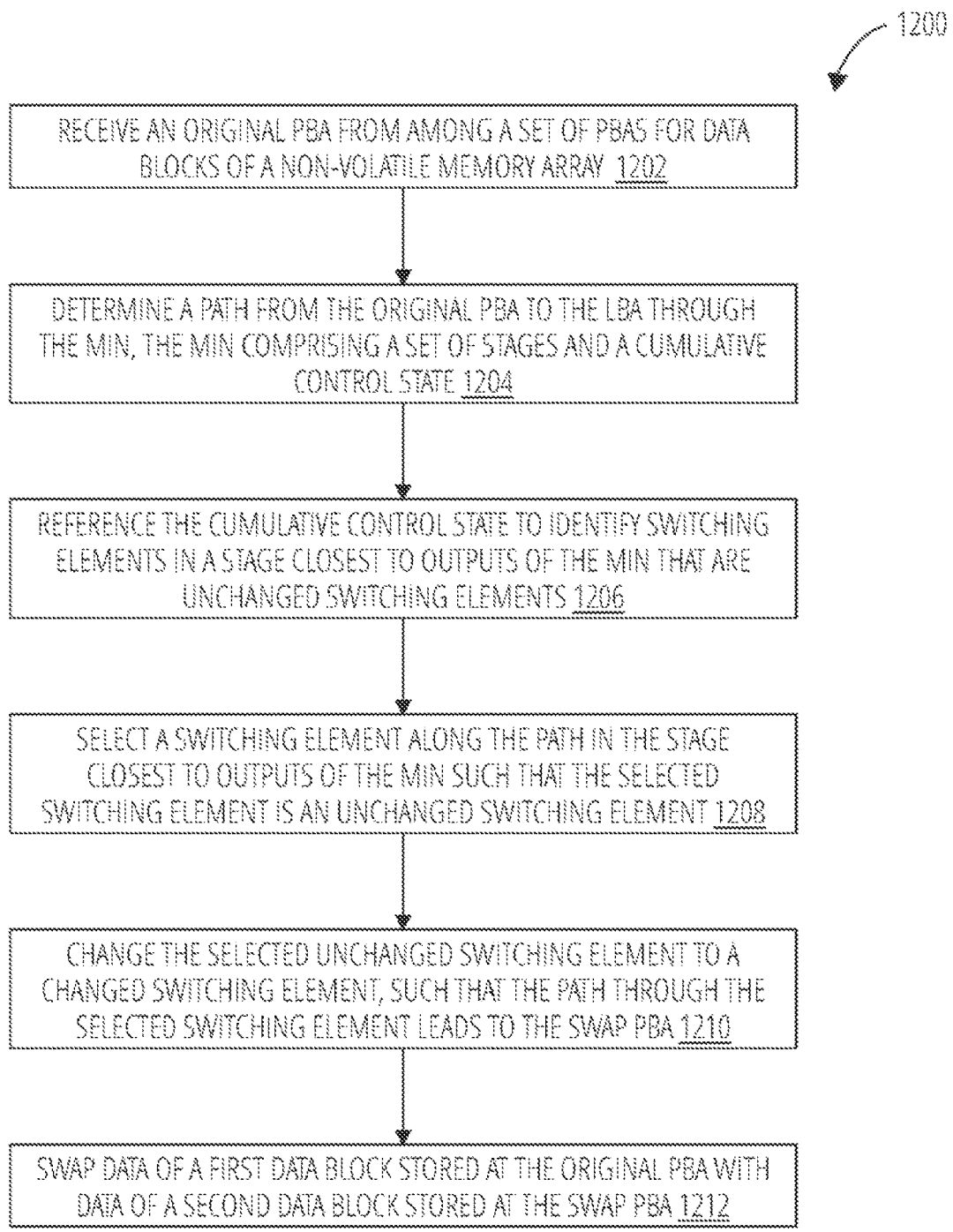
FIG. 12 illustrates a routine 1200 in accordance with one embodiment.

FIG. 12 illustrates a routine 1200 for implementing the disclosed solution, in accordance with one embodiment. The routine 1200 begins at block 1202 when an original physical block address (PBA) is received from among a set of PBAs. The original PBA comprises one of a set of PBAs for data blocks of a non-volatile memory array. A multistage interconnection network (MIN) is used to uniquely map the original PBA to a particular LBA from a write operation. The particular LBA may be one of a set of LBAs.

At block 1204, the wear level manager may determine a path 1310 (See FIG. 13) from the particular LBA referenced in a storage command to the original PBA through the MIN. At block 1206, the wear level manager may reference the cumulative control state to identify switching elements in a stage closest to outputs of the MIN that are unchanged switching elements. The unchanged switching elements may comprise pass-through switching elements and the changed switching elements may comprise cross-over switching elements. Alternatively, in one embodiment, the unchanged switching elements may comprise cross-over switching elements and the changed switching elements may comprise pass-through switching elements.

The wear level manager may then, in block 1208, select a switching element along the path in the stage closest to outputs of the MIN such that the selected switching element is an unchanged switching element.

At block 1210, the wear level manager may change the selected unchanged switching element to a changed switching element, such that the path through the selected switching element leads to the swap PBA. In certain embodiments, a wear level manager may be configured to trace the path 1310 from the selected switching element in the stage closest to outputs of the MIN 1314 that is also on the path 1310 through the MIN to the swap PBA 1318.

At block 1212, the data of a first data block stored at the original PBA is swapped with data of a second data block stored at the swap PBA.

Figure 13:
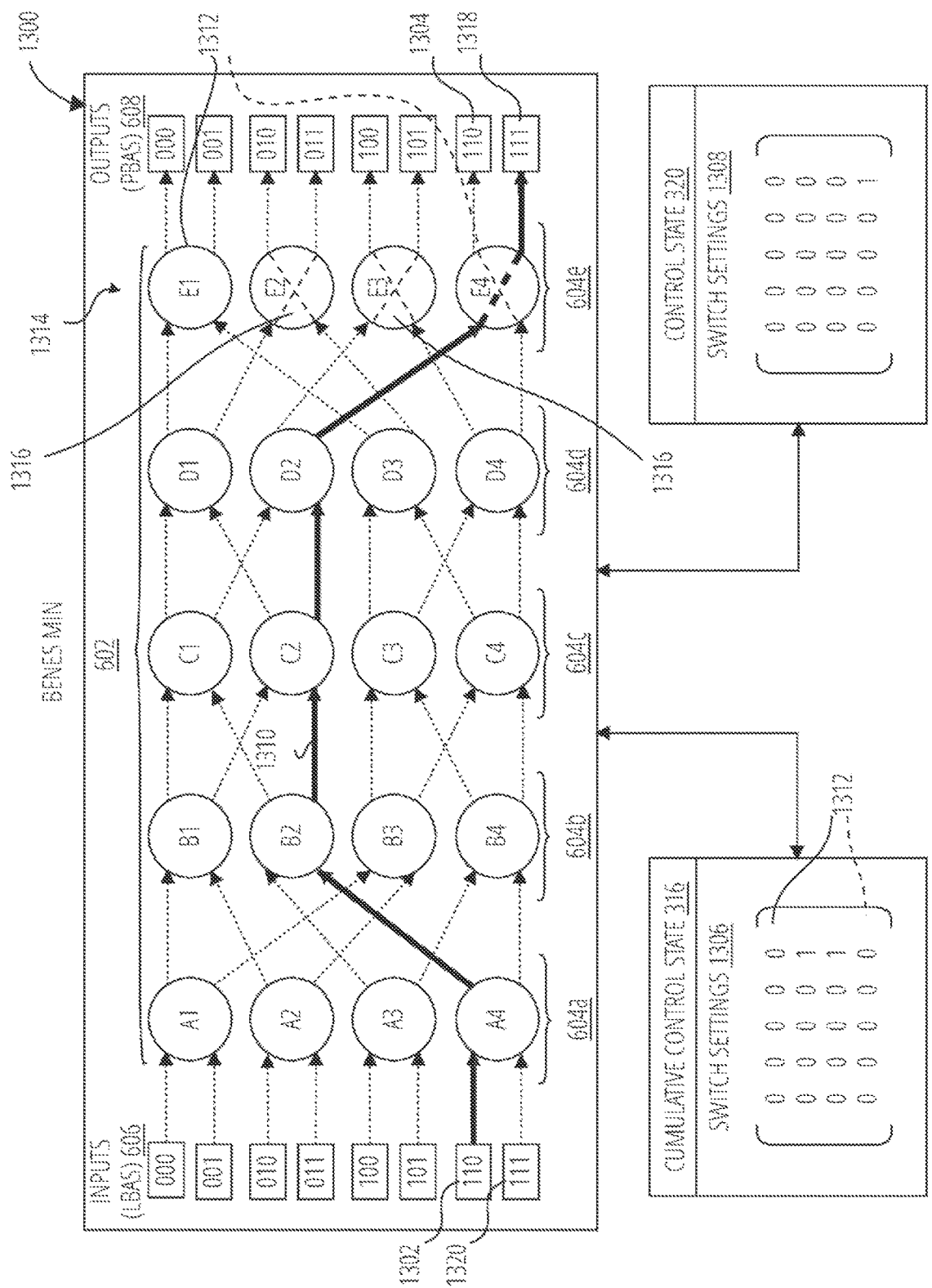
FIG. 13 illustrates a Benes multistage interconnection network 1300 in accordance with one embodiment.

FIG. 13 illustrates a Benes multistage interconnection network 1300 in accordance with one embodiment. In particular, FIG. 13 illustrates a Benes multistage interconnection network 1300 compatible for use with the routine 1200 described in relation to FIG. 12. The switching elements 602 of the Benes multistage interconnection network 1300 may be arranged in five stages: stage 604*a*, stage 604*b*, stage 604*c*, stage 604*d*, and stage 604*e*. The input LBAs 606 are associated with the output PBAs 608 by connections through the switching elements 602.

As described with reference to the routine 1200 described in relation to FIG. 12, a first LBA 1302 may be associated with an original PBA 1304, with the switching elements 602 along the path 1310 from first LBA 1302 to original PBA 1304, with each of the switching elements 602 along the path 1310 being in a pass-through configuration. These switching elements 602 may be considered unchanged switching elements 1312 and may be indicated as '0's in the switch settings 1306 of the cumulative control state 316. Switching elements 602 'E1' and 'E4' both have '0's in the cumulative control state 316 because they are unchanged switching elements 1312. Note that the switch settings 1308 of control state 320 indicate that switching element 602 'E4' is being set to a '1' which means that this switching element 602 is being changed, becoming a changed switching element.

The wear level manager may detect a need to swap the first LBA 1302 to another PBA in order to manage wear on a first data block. A wear level manager may use, or reference, the cumulative control state 316 to determine how to alter the Benes multistage interconnection network 1300 to swap PBAs. In one embodiment, a wear level manager may review a matrix of switch settings 1306 to identify a stage closest to outputs of the MIN 1314. Reading from left to right the right most column of the switch settings 1306 matrix is the stage closest to outputs of the MIN 1314. In one embodiment, a '0' in the switch settings 1306 matrix indicates an unchanged switching element 1312 and a '1' in the switch settings 1306 matrix indicates a changed switching element 1316.

In the illustrated example, because the last column of the switch settings 1306 matrix has at least one entry with a '0', the last column corresponds to the stage closest to outputs of the MIN 1314 that also has at least one switching element that is an unchanged switching element 1312. In one embodiment, with the given example, the wear level manager may identify switching element 'E1' and switching element 'E4' as switching elements that are unchanged switching elements 1312 in a stage closest to outputs of the MIN having unchanged switching elements.

Next, the wear level manager may select a switching element along the path 1310 that is in the stage closest to outputs of the MIN 1314 and also is an unchanged switching element 1312. Thus, in this example, the wear level manager selects switching element 'E4' because 'E4' meets these criteria.

The wear level manager may therefore change switching element E4 to a changed switching element (indicated as a '1' in the switch settings 1308 of the control state 320, and the crossed paths of 'E4'). Changing E4 to a cross-over switching element results in the first LBA 1302 of '100' mapping through the changed switching element ('E4') to the swap PBA 1318 '111' rather than the original PBA 1304 '110.'

A second LBA 1320 '111' may be mapped to the original PBA 1304. A second data block stored at the swap PBA 1318 may be swapped with the first data block stored at the original PBA 1304, as described in routine 1200 of FIG. 12.

Figure 14:
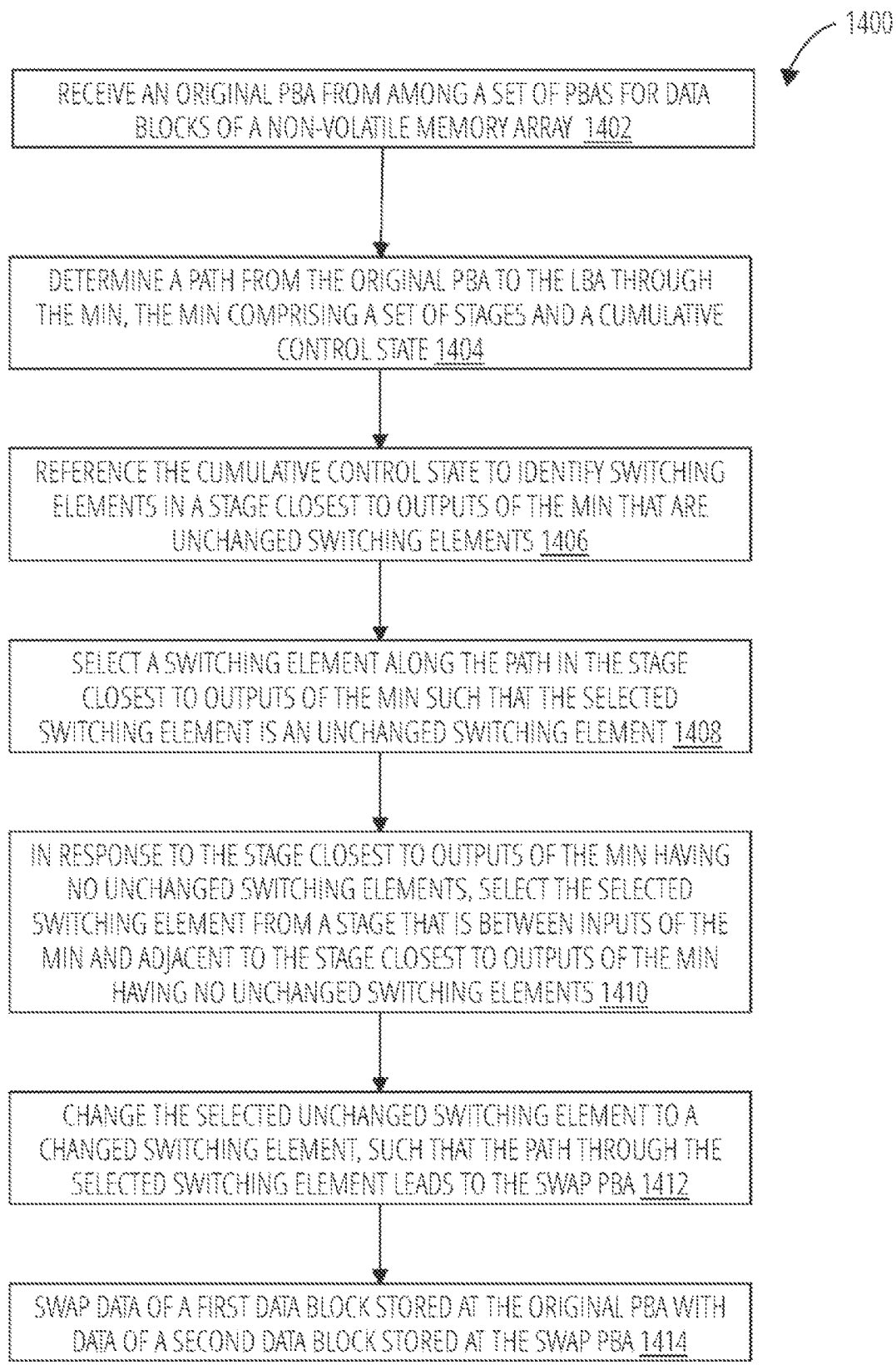
FIG. 14 illustrates a routine 1400 in accordance with one embodiment.

FIG. 14 illustrates a routine 1400 for implementing the disclosed solution, in accordance with one embodiment. The routine 1400 begins at block 1402 when an original physical block address (PBA) is received from among a set of PBAs. The original PBA comprises one of a set of PBAs for data blocks of a non-volatile memory array. A multistage interconnection network (MIN) is used to uniquely map the original PBA to a particular LBA from a write operation. The particular LBA may be one of a set of LBAs.

Figure 15:
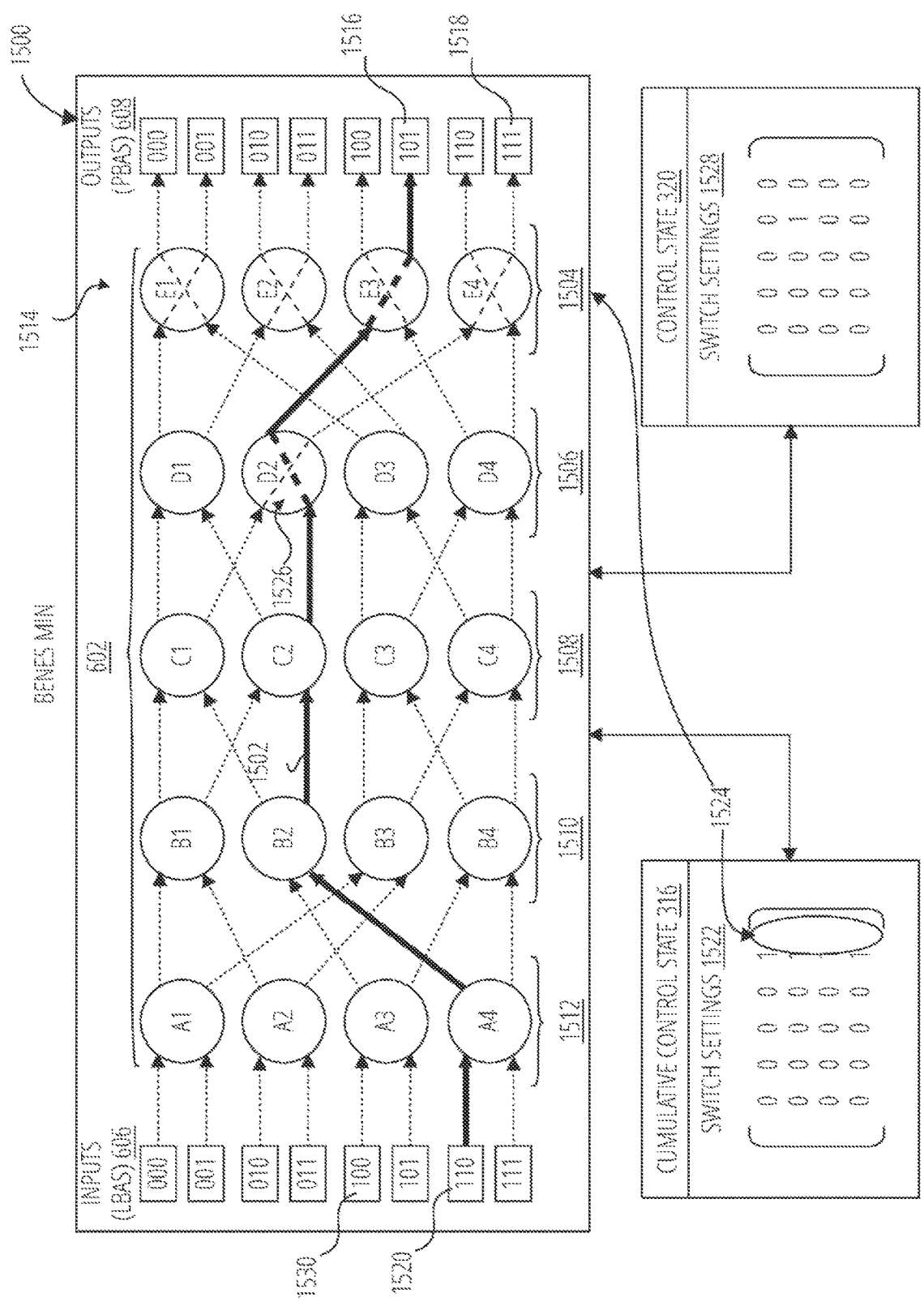
FIG. 15 illustrates a Benes multistage interconnection network 1500 in accordance with one embodiment.

At block 1404, a wear level manager may determine a path 1502 (See FIG. 15) from the particular LBA referenced in a storage command to the original PBA through the MIN, the MIN comprising a set of stages and a cumulative control state. In the example of FIG. 15, the Benes multistage interconnection network 1500 may include five stages: stage 1504, stage 1506, stage 1508, stage 1510, and stage 1512.

At block 1406, a wear level manager may reference the cumulative control state to identify switching elements in a stage closest to outputs of the MIN that are unchanged switching elements. Switching elements of the MIN may be 2×2 switches. The unchanged switching elements may comprise pass-through switching elements and the changed switching elements may comprise cross-over switching elements. Alternatively, in one embodiment, the unchanged switching elements may comprise cross-over switching elements and the changed switching elements may comprise pass-through switching elements.

The wear level manager may then in block 1408 select a switching element along the path in the stage closest to outputs of the MIN such that the selected switching element is an unchanged switching element. As a storage device operates, and certain switching elements 602 are switched to become changed switching elements, the number of unchanged switching elements decreases. In a particular, embodiment, that operates in accordance with the routine 1200, for example, eventually switching elements in a right most column of the Benes multistage interconnection network 1500 may all become changed switching elements.

In one embodiment, such as routine 1400, and with reference to FIG. 15, if the stage closest to outputs of the MIN 1514 (e.g., stage 1504) has no unchanged switching elements (E1-E4 are changed switching elements), at block 1410, the wear level manager may select a switching element from a stage that is between inputs of the MIN (e.g., LBAs 606) and adjacent to the stage closest to outputs of the MIN having only changed switching elements (e.g., stage 1504).

In the example of FIG. 14 and FIG. 15, the wear level manager may select an unchanged switching element from one of stage 1506, stage 1508, stage 1510, or stage 1512. In one embodiment, the wear level manager searches for unchanged switching elements in the stage among stage 1506, stage 1508, stage 1510, and stage 1512 that is closest to outputs of the MIN. Therefore, in FIG. 15, the wear level manager would start with stage 1506. If stage 1506 includes an unchanged switching element, that switching element may be selected to be changed. If stage 1506 includes only changed switching elements, then the wear level manager may check stage 1508. The wear level manager may follow this same pattern iteratively until all stages between the MIN inputs and the stage closest to outputs of the MIN have each been checked.

At block 1412, the wear level manager may change a selected unchanged switching element to a changed switching element, such that a path 1502 through the selected switching element leads to the swap PBA 1516. Finally, at block 1414, the data of a first data block stored at the original PBA 1518 may be swapped with data of a second data block stored at the swap PBA 1516.

FIG. 15 illustrates a Benes multistage interconnection network 1500 in accordance with one embodiment. In particular, FIG. 15 illustrates a Benes multistage interconnection network 1500 compatible for use with the routine 1400 described in relation to FIG. 14. The input LBAs 606 are associated with the output PBAs 608 by a connection or path through the switching elements 602.

As described with reference to the routine 1400 introduced in FIG. 14, a first LBA 1520 '110' may be associated with an original PBA 1518 '111', with the switching elements 602 along the path 1502 from first LBA 1520 to original PBA 1518 in a pass-through configuration, with the exception of the switching element 602 in stage 1504. These may be considered unchanged switching elements 602, indicated as '0's in the switch settings 1522 data structure of the cumulative control state 316, or as changed switching elements 1524, indicated as '1's in the switch settings 1522.

The wear level manager may detect a need to swap the first LBA 1520 to another PBA in order to manage wear on a first data block. The wear level manager may use the cumulative control state 316 to determine if a switching element 602 along the path 1502 and within the stage 1504 is an unchanged switching element.

In the illustrated case, the switching elements 602 in the stage 1504 (E1-4) are changed switching elements 1524. This is indicated by the '1's in the right-most column of the switch settings 1522 matrix of the cumulative control state 316. The wear level manager may therefore review a stage adjacent to the right-most stage (e.g., stage 1506) and iteratively in each stage between stage 1504 and the inputs (e.g., LBAs 606) for unchanged switching elements 602 along the path 1502.

Suppose switching element 1526 ('D2') is an unchanged switching element. The wear level manager may therefore change switching element 1526 ('D2') to a changed switching element (indicated as a '1' in the switch settings 1528 of the control state 320). Changing switching element 1526 ('D2') to be a cross-over switching element results in the first LBA 1520 of '110' mapping to the swap PBA 1516 '101' rather than the original PBA 1518 '111'.

A second LBA 1530 '100' may have originally been mapped to the swap PBA 1516. A second data block stored at the swap PBA 1516 may be swapped with a first data block stored at the original PBA 1518, as described in routine 1400 of FIG. 14.

Figure 16:
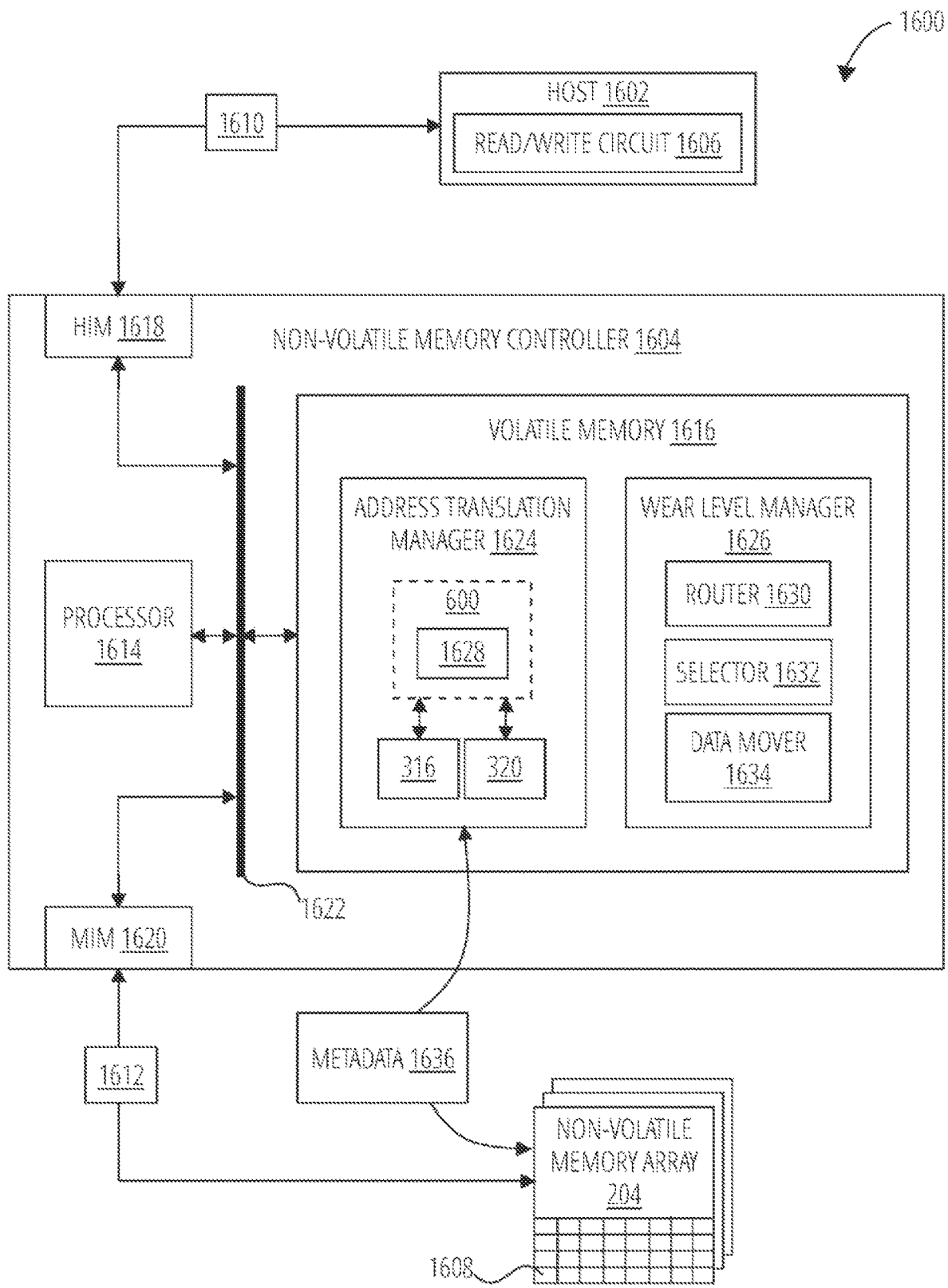
FIG. 16 illustrates system 1600 in accordance with one embodiment.

FIG. 16 illustrates a system 1600 in accordance with one embodiment. The system 1600 may comprise a host 1602, a non-volatile memory controller 1604 such as was introduced in FIG. 3, and a non-volatile memory array 204, such as was introduced in FIG. 2.

The host 1602 may incorporate a read/write circuit 1606 configured to issue storage commands to perform read operations and write operations, among other activities, using logical block addresses (LBAs). The logical block addresses used by the host 1602 may be associated with physical block addresses (PBAs) of data on the non-volatile memory array 204. "Read/write circuit" refers to a device, component, element, module, system, sub-system, circuitry, logic, hardware, sub-circuit, or circuit configured and/or operational to read data from and write data to a storage media, such as storage cells of a storage array.

The non-volatile memory array 204 may store data in memory cells 1608. "Memory cell" refers to a type of storage media configured to represent one or more binary values by way of a determinable physical characteristic of the storage media when the storage media is sensed, read, or detected to determine what binary value(s) was last stored in the memory cell. Memory cell and storage cell are used interchangeably herein.

The non-volatile memory controller 1604 may include logical and/or functional modules that facilitate the translation from an LBA of a storage command 1610 used by the host 1602 to a PBA for write access 1612 within the non-volatile memory array 204 of the data requested or transmitted. The non-volatile memory controller 1604 may comprise a processor 1614, a volatile memory 1616, a host interface manager 1618 (HIM), and a memory interface manager 1620 (MIM).

The host interface manager 1618 may be configured to communicate between the host 1602 and the non-volatile memory controller 1604. "Host interface manager" refers to hardware, firmware, software, circuitry, component, module, logic, device, or apparatus configured, programmed, designed, arranged, or engineered to support, interface with, and conduct communications between a host and a peripheral device such as a memory device, and/or non-volatile storage device.

The memory interface manager 1620 may be coupled to the non-volatile memory array 204 for reading and writing data to the non-volatile memory array 204. The host interface manager 1618, processor 1614, volatile memory 1616, and memory interface manager 1620, may communicate within the non-volatile memory controller 1604 by way of a bus 1622. "Memory interface manager" or "Flash interface manager" refers to any hardware, firmware, software, circuitry, component, module, logic, device, or apparatus configured, programmed, designed, arranged, or engineered to support, interface with, and conduct communications between a storage or memory controller and one or more memory die or memory chips.

The volatile memory 1616 may comprise an address translation manager 1624 and a wear level manager 1626 which may include the same, or similar, functionality to the address translation manager 302 and wear level manager 308, introduced in relation to FIG. 3. The address translation manager 1624, in one embodiment, may comprise a Benes multistage interconnection network 600, a control state 320 and a cumulative control state 316, such as those discussed in detail above. The Benes multistage interconnection network 600 may be configured to map each LBA of a storage command 1610 received from the host 1602 for the non-volatile memory array 204 to a unique PBA for write access 1612 of the data on the non-volatile memory array 204. The Benes multistage interconnection network 600 may comprise a plurality of switching elements 1628. The control state 320 may account for a current change made to the Benes multistage interconnection network 600. The cumulative control state 316 may account for changes to the Benes multistage interconnection network 600 over time.

The wear level manager 1626 may comprise a router 1630, a selector 1632, and a data mover 1634. The router 1630 may determine a path through the Benes multistage interconnection network 600 from an original PBA for an LBA of a write operation or read operation. The Benes multistage interconnection network 600 may be arranged in stages of switching elements 1628 as discussed in detail previously.

The selector 1632 may reference the cumulative control state 316 to identify switching elements 1628 in a stage closest to outputs of the Benes multistage interconnection network 600 that are unchanged switching elements. "Selector" refers to any hardware, software, firmware, circuit, component, module, logic, device, or apparatus configured, programmed, designed, or engineered to choose, determine, or select one or more items or options from a set of items or options.

The selector 1632 may select a switching element 1628 along the path in the stage closest to the outputs of the Benes multistage interconnection network 600 such that the selected switching element 1628 is an unchanged switching element. The selector 1632 may then change the selected unchanged switching element to a changed switching element, such that the path through the selected switching element leads to a swap PBA. The data mover 1634 may atomically swap data of a first data block stored at the original PBA with data of a second data block stored at the swap PBA. The data mover 1634 may include similar features, functions, and/or operations to those of the data mover 314 described in relation to FIG. 3.

In one embodiment, the selector 1632 may select the selected switching element from a stage that is between inputs of the Benes multistage interconnection network 600 (e.g. LBAs 606 in FIG. 15 for example) and a stage (e.g., stage 1506 in the example of FIG. 15) adjacent to the stage closest to outputs of the MIN of the Benes multistage interconnection network 600 that has no unchanged switching elements (e.g., stage 1504 in the example of FIG. 15). The selector 1632 may search for a switching element to select in response to the stage closest to outputs of the MIN having no unchanged switching elements.

In one embodiment, the LBA of a storage command 1610, specifically of a write operation, may comprise an N-bit address. In certain embodiments, a Benes multistage interconnection network 600 that maps 2^N LBAs to 2^N PBAs may be prohibitively large to implement in hardware or provide a desired level of performance. For example, suppose N=32 so that the Benes multistage interconnection network 600 would need to 2^32 LBAs to 2^32 PBAs, that is 4,294,967,296 LBAs and 4,294,967,296 PBAs.

Consequently, instead of implementing each node, stage, and edge of a Benes multistage interconnection network 600 in hardware or software/firmware with volatile memory, embodiments of this solution implement logic and/or software/firmware, such as for example path tracing circuit 304, configured to operate on a portion the Benes network at a time and are configured to deterministically traverse the Benes network with minimal processing and memory and storage resources. For example, in one embodiment, the Benes multistage interconnection network 600 may be implemented using a sequential circuit or state machine such that the latency for traversing a path through the Benes multistage interconnection network 600 may directly relates to a number of stages in the Benes multistage interconnection network 600.

The wear level manager 1626 and/or the address translation manager 1624 may determine the path and swap PBAs using a portion of the Benes multistage interconnection network 600 (that portion is represented by the Benes network metadata 1636 together with configuration information that defines how a Benes multistage interconnection network 600 is configured and organized) in the volatile memory 1616. By loading a portion of the Benes multistage interconnection network 600 (e.g. Benes network metadata 1636) the address translation manager 1624 and/or wear level manager 1626 can use, access, monitor, manipulate, manage, navigate, and traverse a Benes multistage interconnection network 600 or any multistage interconnection network having a high number of inputs and outputs, where high is a value greater than five. Advantageously, the address translation manager 1624 and/or wear level manager 1626 loads and works with just the portion(s) relevant to where the address translation manager 1624 and/or wear level manager 1626 is in navigating and working with nodes of the multistage interconnection network.

Benes network metadata 1636 may be stored completely, or in part, in the volatile memory 1616, and/or in the non-volatile memory array 204. For example, the Benes network metadata 1636 may comprise a subset of switch settings from the cumulative control state and/or control state and the address translation manager 1624 may include logic to determine a PBA for a particular LBA. Similarly, the address translation manager 1624 and wear level manager 1626 may collaborate to load just enough Benes network metadata 1636 for swapping of an original PBA and a swap PBA and coordinating with the data mover 1634 to move the associated data.

Figure 17:
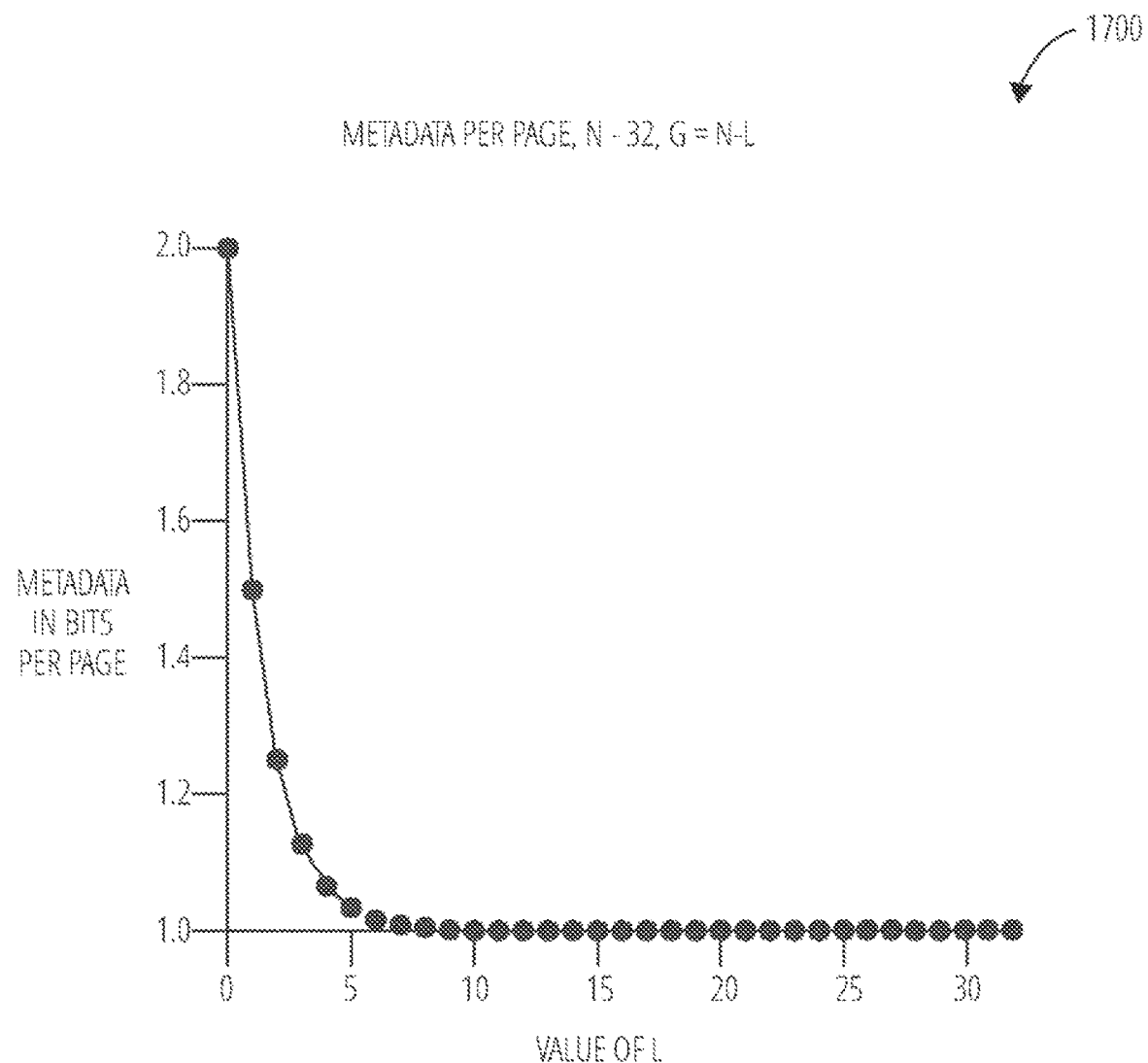
FIG. 17 illustrates a graph of metadata per page in accordance with one embodiment.

FIG. 17 shows a graph 1700 illustrating the number of bits of metadata that need to be stored per page of volatile memory based on a value of L, which is described in detail below. This graph 1700 relates to the use of a Benes network implemented using various routines described herein, for example routine 1200 introduced in FIG. 12 and routine 1400 introduced in FIG. 14. This graph 1700 also relates to a system using 32-bit addressing, such as the system 1600 described with respect to FIG. 16.

The solution disclosed herein may be used to address and manage wear leveling for a non-volatile memory array 204 such as that introduced in FIG. 2. Referring now to FIG. 2, a number of sub-arrays 206 may be divided into partitions 208. For example, there may be two sub-arrays 206, each of which may be addressed using the most significant bit of the LBA. In this manner, one bit of the LBA may be used to address a sub-array 206, which may be thought of as a "global partition" and 31 bits may be used to address a partition 208, which may be thought of as a "local partition." This is presented as an illustrative example, and not intended to limit this disclosure. Generally speaking, an N-bit address may be used to access G global partitions and L local partitions, where G+L=N.

In certain embodiment, mapping between sub-arrays 206 and partitions 208 may be implemented using a common multistage interconnection network. At the global level, part of an LBA may identify a particular partition 208 and the remaining bits of the LBA may identify a PBA within the particular partition 208.

A local partition in one embodiment may be a physical page of the non-volatile memory array. Using our example above, where a single, most significant bit is used to address global partitions (G=1), and 31 bits are used to address pages (L=31), the 32-bit address may be used to address $2^G$ global partitions and $2^L$ pages within each global partition.

Assuming a time variant Benes mapping for the pages of $2^L \times 2^L$ and a time variant Benes mapping of $2^G \times 2^G$ for the global partitions, the graph illustrated in FIG. 17 shows how the metadata needed per page to store the mapping based on the number of bits used to address the pages (L) approaches a minimum of 1.0 as L increases from 0 (representing 32-bit addressing in a conventional system), where 2.0 bits of metadata are needed per page. Memory area needed may be similar for mapping using an Omega network MIN.

Figure 18:
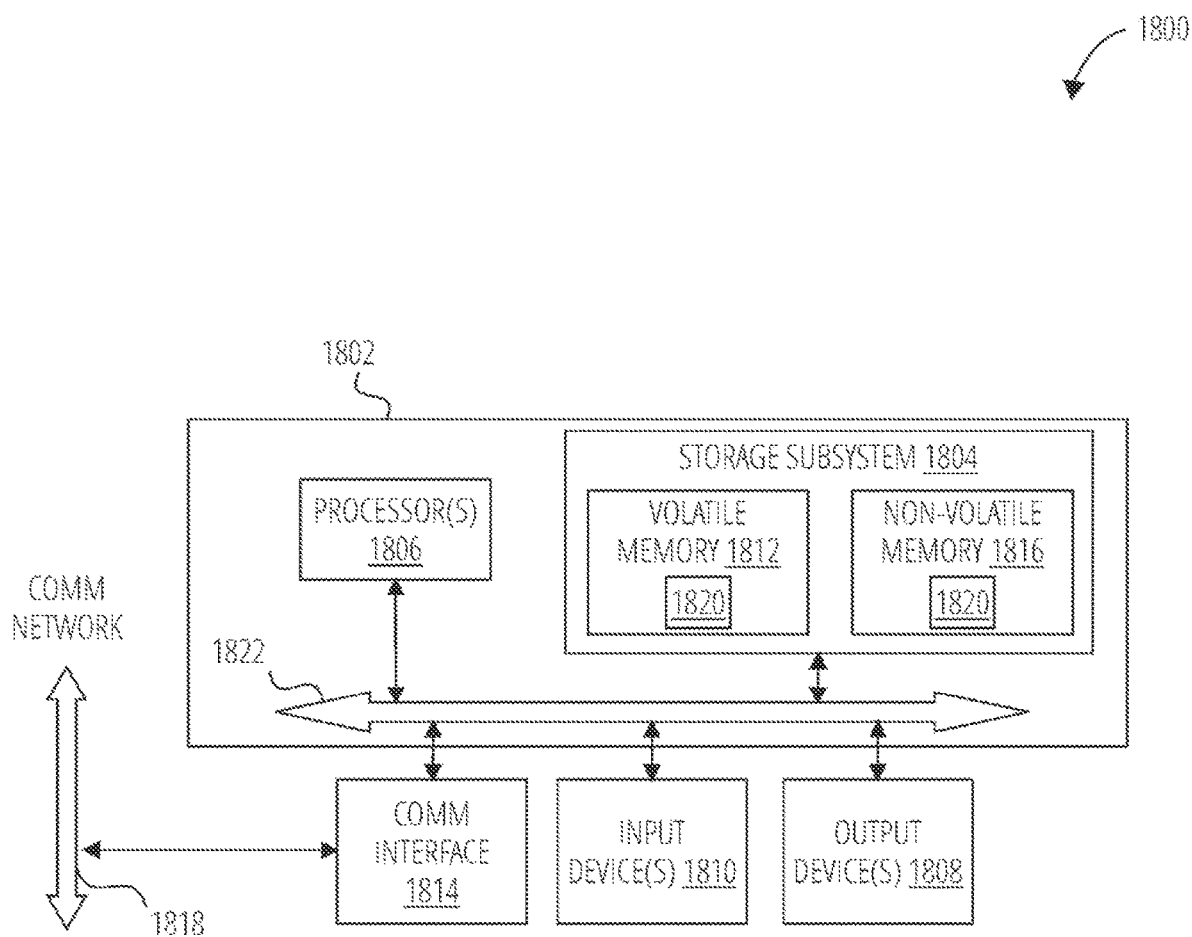
FIG. 18 is an example block diagram of a computing device 1800 that may incorporate certain embodiments.

FIG. 18 is an example block diagram of a computing device 1800 that may incorporate embodiments of the solution. FIG. 18 is merely illustrative of a machine system to carry out aspects of the technical processes described herein and does not limit the scope of the claims. One of ordinary skill in the art would recognize other variations, modifications, and alternatives. In certain embodiments, the computing device 1800 includes a data processing system 1802, a communication network 1818, communication network interface 1814, input device(s) 1810, output device(s) 1808, and the like.

As depicted in FIG. 18, the data processing system 1802 may include one or more processor(s) 1806 and a storage subsystem 1804. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor core, and the like.

The processor(s) 1806 communicate with a number of peripheral devices via a bus subsystem 1822. These peripheral devices may include input device(s) 1810, output device(s) 1808, communication network interface 1814, and the storage subsystem 1804. The storage subsystem 1804, in one embodiment, comprises one or more storage devices and/or one or more memory devices.

In one embodiment, the storage subsystem 1804 includes a volatile memory 1812 and a non-volatile memory 1816. The volatile memory 1812 and/or the non-volatile memory 1816 may store computer-executable instructions that alone or together form logic 1820 that when applied to, and executed by, the processor(s) 1806 implement embodiments of the processes disclosed herein.

The input device(s) 1810 include devices and mechanisms for inputting information to the data processing system 1802. These may include a keyboard, a keypad, a touch screen incorporated into a graphical user interface, audio input devices such as voice recognition systems, microphones, and other types of input devices. In various embodiments, the input device(s) 1810 may be embodied as a computer mouse, a trackball, a track pad, a joystick, wireless remote, drawing tablet, voice command system, eye tracking system, and the like. The input device(s) 1810 typically allow a user to select objects, icons, control areas, text and the like that appear on a graphical user interface via a command such as a click of a button or the like.

The output device(s) 1808 include devices and mechanisms for outputting information from the data processing system 1802. These may include a graphical user interface, speakers, printers, infrared LEDs, and so on, as well understood in the art. In certain embodiments, a graphical user interface is coupled to the bus subsystem 1822 directly by way of a wired connection. In other embodiments, the graphical user interface couples to the data processing system 1802 by way of the communication network interface 1814. For example, the graphical user interface may comprise a command line interface on a separate computing device 1800 such as desktop, server, or mobile device.

The communication network interface 1814 provides an interface to communication networks (e.g., communication network 1818) and devices external to the data processing system 1802. The communication network interface 1814 may serve as an interface for receiving data from and transmitting data to other systems. Embodiments of the communication network interface 1814 may include an Ethernet interface, a modem (telephone, satellite, cable, ISDN), (asynchronous) digital subscriber line (DSL), FireWire, USB, a wireless communication interface such as Bluetooth or WiFi, a near field communication wireless interface, a cellular interface, and the like.

The communication network interface 1814 may be coupled to the communication network 1818 via an antenna, a cable, or the Ike. In some embodiments, the communication network interface 1814 may be physically integrated on a circuit board of the data processing system 1802, or in some cases may be implemented in software or firmware, such as "soft modems", or the like.

The computing device 1800 may include logic that enables communications over a network using protocols such as HTTP, TCP/IP, RTP/RTSP, IPX, UDP and the like.

The volatile memory 1812 and the non-volatile memory 1816 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1812 and the non-volatile memory 1816 may be configured to store the basic programming and data constructs that provide the functionality of the disclosed processes and other embodiments thereof that fall within the scope of the present disclosure.

Logic 1820 that implements one or more parts of embodiments of the solution may be stored in the volatile memory 1812 and/or the non-volatile memory 1816. Logic 1820 may be read from the volatile memory 1812 and/or non-volatile memory 1816 and executed by the processor(s) 1806. The volatile memory 1812 and the non-volatile memory 1816 may also provide a repository for storing data used by the logic 1820.

The volatile memory 1812 and the non-volatile memory 1816 may include a number of memories including a main random write access memory (RAM) for storage of instructions and data during program execution and a read only memory (ROM) in which read-only non-transitory instructions are stored. The volatile memory 1812 and the non-volatile memory 1816 may include a file storage subsystem providing persistent (non-volatile) storage for program and data files. The volatile memory 1812 and the non-volatile memory 1816 may include removable storage systems, such as removable FLASH memory.

The bus subsystem 1822 provides a mechanism for enabling the various components and subsystems of data processing system 1802 communicate with each other as intended. Although the communication network interface 1814 is depicted schematically as a single bus, some embodiments of the bus subsystem 1822 may utilize multiple distinct busses.

It will be readily apparent to one of ordinary skill in the art that the computing device 1800 may be a device such as a smartphone, a desktop computer, a laptop computer, a rack-mounted computer system, a computer server, or a tablet computer device. As commonly known in the art, the computing device 1800 may be implemented as a collection of multiple networked computing devices. Further, the computing device 1800 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

Within this disclosure, different entities (which may variously be referred to as "units," "circuits," other components, etc.) may be described or claimed as "configured" to perform one or more tasks or operations. This formulation—[entity] configured to [perform one or more tasks]-is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

"Logic" refers to software, firmware, a state machine, a sub-circuit, circuitry, one or more electronic components, machine memory circuits, non-transitory machine readable media, and/or the like which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method, comprising:
  receiving an original physical block address (PBA) for a logical block address (LBA) of a write operation, the original PBA comprising one of a set of PBAs for data blocks of a non-volatile memory array, each PBA of the set of PBAs uniquely mapped by way of a multistage interconnection network (MIN) to a particular LBA of a set of LBAs;
  determining a swap PBA for the LBA, the swap PBA determined from the set of PBAs uniquely mapped by way of the MIN, wherein a write access monitor is configured to signal a wear level manager in response to a pseudo-random number of write-accesses, wherein the pseudo-random number of write accesses comprises a number N that occurs on average once for every D write accesses, where D>10 and wherein a cumulative control state comprises switch settings for switching elements of the MIN and the MIN comprises one of an Omega network, a Benes network, and a bitonic network;
  configuring the MIN such that the LBA maps to the swap PBA; and
  swapping data of a first data block stored at the original PBA with data of a second data block stored at the swap PBA.

2. The method of claim 1, wherein the multistage interconnection network comprises a rearrangeable non-blocking multistage interconnection network and determining a swap PBA further comprises randomly selecting a swap PBA from the set of PBAs excluding the original PBA.

3. The method of claim 2, wherein the multistage interconnection network comprises a Benes network.

4. The method of claim 1, wherein determining a swap PBA further comprises:
  determining a path from the original PBA to the LBA through the MIN;
  randomly selecting a switching element along the path; and
  changing the selected switching element, such that the path through the selected switching element changes to another output of the selected switching element and leads to the swap PBA.

5. The method of claim 1, wherein determining a swap PBA further comprises:
  determining a path from the original PBA to the LBA through the MIN, the MIN comprising a set of stages and a cumulative control state;
  referencing the cumulative control state to identify switching elements in a stage closest to outputs of the MIN that are unchanged switching elements;

selecting a switching element along the path in the stage closest to outputs of the MIN such that the selected switching element is an unchanged switching element; and changing the selected unchanged switching element to a changed switching element, such that the path through the selected switching element leads to the swap PBA.

6. The method of claim 5, further comprising in response to the stage closest to outputs of the MIN having no unchanged switching elements, selecting the selected switching element from a stage that is between inputs of the MIN and adjacent to the stage closest to outputs of the MIN having no unchanged switching elements.

7. The method of claim 5, further comprising:
modifying a control state for the MIN to account for the selected switching element changing to the changed switching element; and
modifying the cumulative control state to account for the modified control state.

8. The method of claim 7, wherein the cumulative control state comprises a data structure configured to store an entry for each changed switching element that maps to changed switching elements within the MIN and the cumulative control state is configured to identify switching elements not accounted for in the data structure as the unchanged switching elements.

9. The method of claim 5, further comprising tracing the path from the selected switching element through the MIN to the swap PBA.

10. The method of claim 1, wherein the multistage interconnection network comprises logic configured to map the LBA to the original PBA based on a cumulative control state.

11. A circuit, comprising:
a write access monitor configured to count write accesses to a non-volatile memory array by a read/write circuit, wherein the write access monitor is configured to signal a wear level manager in response to a pseudo-random number of write accesses by the read/write circuit, wherein the pseudo-random number of write accesses comprises a number N that occurs on average once for every D write accesses, where D>10 and wherein a cumulative control state comprises switch settings for switching elements of a MIN and the MIN comprises one of an Omega network, a Benes network, and a bitonic network;
a path tracing circuit configured to map logical block addresses (LBAs) for data blocks of the non-volatile memory array to a unique physical block address (PBA) by tracing a path through a multistage interconnection network (MIN) from each LBA to the unique PBA, the MIN comprising a plurality of switching elements;
an address translation manager configured to translate an LBA of each write access to a PBA by way of the path tracing circuit;
a control state configured to account for a current change made to the MIN;
the cumulative control state configured to account for changes to the MIN;
the wear level manager configured to change a mapping of two LBAs and two corresponding PBAs of the MIN in response to a signal from the write access monitor; and
a data mover configured to atomically swap data stored in data blocks of the two swapped PBAs in response to a signal from the wear level manager.

12. The circuit of claim 11, wherein the MIN comprises a rearrangeable non-blocking multistage interconnection network and wherein the wear level manager is configured to:
randomly select a swap PBA to swap with an LBA of a write access to the non-volatile memory array by the read/write circuit;
determine a switching element common to an original PBA associated with the LBA and common to the swap PBA associated with another LBA; and
change the switching element such that the LBA of the write access routes to the swap PBA.

13. The circuit of claim 11, wherein the wear level manager is configured to:
determine a path from an LBA of a write access to the non-volatile memory array by the read/write circuit to an original PBA through the MIN;
randomly select a switching element along the path; and
change the selected switching element, such that the path through the selected switching element changes to another output of the selected switching element and leads to a swap PBA.

14. The circuit of claim 11, wherein the wear level manager is configured to:
determine a path from an LBA of a write access to the non-volatile memory array by the read/write circuit to an original PBA through the MIN, the MIN comprising a set of stages;
reference the cumulative control state to identify switching elements in a stage closest to outputs of the MIN that are unchanged switching elements;
select a switching element along the path in the stage closest to outputs of the MIN where the selected switching element is an unchanged switching element; and
change the selected unchanged switching element to a changed switching element, such that the path through the selected switching element leads to a swap PBA.

15. The circuit of claim 14, where the wear level manager is further configured to select the selected switching element from a stage that is between inputs of the MIN and adjacent to the stage closest to outputs of the MIN having no unchanged switching elements in response to the stage closest to outputs of the MIN having no unchanged switching dements; and
wherein switching dements of the MIN comprises 2×2 switches and the unchanged switching dements comprise pass-through switching elements and the changed switching dements comprise cross-over switching dements.

16. A system, comprising:
a non-volatile memory array configured to store data in memory cells thereof; and
a non-volatile memory controller comprising:
a processor;
volatile memory;
a host interface manager configured to communicate between a host and the non-volatile memory controller;
an address translation manager comprising:
a write access monitor configured to signal a wear level manager in response to a pseudo-random number of write accesses by a read/write circuit, wherein the pseudo-random number of write access comprises a number N that occurs on average once for every D write accesses, where D>10 and wherein a cumulative control state comprises switch settings for switching elements of a MIN and the MIN comprises a Benes network:
 the Benes network configured to map each logical block address (LBA) for the non-volatile memory array to a unique physical block address (PBA), the Benes network comprising a plurality of switching elements;
 a control state configured to account for a current change made to the Benes network; and
 the cumulative control state configured to account for changes to the Benes network over time;
a wear level manager comprising:
 a router configured to determine a path through the Benes network from an original PBA for an LBA of a write operation, the Benes network comprising a set of stages;
 a selector configured to:
  reference the cumulative control state to identify switching elements in a stage closest to outputs of the Benes network that are unchanged switching elements;
  select a switching element along the path in the stage closest to outputs of the Benes network such that the selected switching element is an unchanged switching element; and
  change the selected unchanged switching element to a changed switching element, such that the path through the selected switching element leads to a swap PBA; and
 a data mover configured to atomically swap data of a first data block stored at the original PBA with data of a second data block stored at the swap PBA; and
a memory interface manager coupled to the non-volatile memory array for reading and writing data to the non-volatile memory array.

17. The system of claim 16, wherein the selector is further configured to select the selected switching element from a stage that is between inputs of the Benes network and adjacent to a stage closest to outputs of the Benes network that has no unchanged switching elements, in response to the stage closest to outputs of the Benes network having no unchanged switching elements.

18. The system of claim 16, wherein the LBA of the write operation comprises an N-bit address and the Benes network maps $2^{\wedge}N$ LBAs to $2^{\wedge}N$ PBAs and wherein the wear level manager is configured to determine the path and swap PBAs using a portion of the Benes network in the volatile memory.

19. A circuit, comprising:
 a non-volatile memory array comprising data blocks addressable by logical block addresses;
 a processor comprising:
  a read/write circuit configured to read and write data blocks to the non-volatile memory array using logical block addresses, wherein a number of write-accesses by the read/write circuit is tracked, wherein the number of write-accesses is pseudo-random, wherein the pseudo-random number of write accesses comprises a number N that occurs on average once for every D write accesses, where D>10 and wherein a cumulative control state comprises switch settings for switching elements of a MIN and the MIN comprises one of an Omega network, a Benes network, and a bitonic network;
  a path tracing circuit configured to map each logical block address (LBA) for the non-volatile memory array to a unique physical block address (PBA) by tracing a path through a multistage interconnection network (MIN) from each LBA to the unique PBA, the MIN comprising a plurality of switching elements;
  address translation manager configured to translate an LBA of each write access to a PBA by way of the path tracing circuit; and
  the cumulative control state configured to account for path changes within the MIN.

20. The circuit of claim 19, wherein the path tracing circuit is configured to iteratively process sets of stages of the MIN to map an LBA to the unique PBA.

21. The circuit of claim 19, where in the MIN comprises N inputs by N outputs where N≥10.

* * * * *